United States Patent
Nishida et al.

(10) Patent No.: US 6,493,623 B2
(45) Date of Patent: Dec. 10, 2002

(54) DRIVING FORCE CONTROL SYSTEM FOR FOUR-WHEEL DRIVE VEHICLES

(75) Inventors: Kenzo Nishida, Saitama-ken (JP); Norihisa Nihanda, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/816,410

(22) Filed: Mar. 26, 2001

(65) Prior Publication Data

US 2001/0027369 A1 Oct. 4, 2001

(30) Foreign Application Priority Data

Mar. 29, 2000 (JP) ........................................ 2000-091095

(51) Int. Cl.[7] .............................................. G06F 7/00
(52) U.S. Cl. ........................................................ 701/89
(58) Field of Search ............................. 701/89, 69, 67; 180/197, 233, 248

(56) References Cited

U.S. PATENT DOCUMENTS

| | | | |
|---|---|---|---|
| 5,631,829 A | 5/1997 | Takasaki et al. | 364/424.098 |
| 5,894,904 A | 4/1999 | Yakou et al. | 180/247 |
| 5,947,224 A | 9/1999 | Kouno | 180/248 |

*Primary Examiner*—Yonel Beaulieu
(74) *Attorney, Agent, or Firm*—Armstrong, Westerman & Hattori, LLP

(57) ABSTRACT

A driving force control system for a four-wheel drive vehicle[is disclosed] which enables the vehicle to smoothly start on a low-$\mu$ road surface, and is capable to distributing just required amounts or driving forces to auxiliary drive wheels depending on an actual accelerating condition of the vehicle, thereby improving the response and fuel economy of the vehicle. The four-wheel drive vehicle includes front wheels as main drive wheels, and rear wheels as auxiliary drive wheels. The driving force control system controls engagement forces of electromagnetic clutches to thereby control the driving forces (torques) distributed to the rear wheels. The 2/4WD·ECU of the driving force control system calculates a filtered vehicle acceleration XGF1F of the vehicle 2 based on a drive torque TD, and then calculates a basic VATC torque value VATC based on the calculated filtered vehicle acceleration XGF1F, for use in calculation of the final desired VATC torque value TOBJM of torque to be distributed to the rear wheels.

15 Claims, 18 Drawing Sheets

DRIVING FORCE CONTROL SYSTEM FOR FOUR-WHEEL DRIVE VEHICLES

BACKGROUND OF THE INVENTION

1. Field of the Invention

This invention relates to a driving force control system for a four-wheel drive vehicle including a pair of front wheels, and a pair of rear wheels, one of the pairs being main drive wheels, and another of the pairs being auxiliary drive wheels, the driving force control system controlling engagement forces of clutches to thereby control driving forces distributed to the auxiliary drive wheels.

2. Description of the Related Art

Conventionally, a driving force controls system of this kind has been proposed, e.g., by Japanese Laid-Open Patent Publication (Kokai) No. 9-109716, for a four-wheel drive vehicle (hereinafter referred to as he vehicle including rear wheels as main drive wheels, and front wheels as auxiliary drive wheels. This driving force control system controls the engagement forces of variable torque clutches to thereby control torque distributed or allocated to the front wheels, i.e., the auxiliary drive wheels. More specifically, a first front-wheel distribution torque is calculated based on the difference (hereinafter referred to as ear-front wheel speed difference obtained by subtracting the wheel speed of the front wheels from the wheel speed of the rear wheels. A second front-wheel distribution torque is also calculated based on the oil temperature of the variable torque clutches. Further, a third front-wheel distribution torque is calculated based on a throttle opening when the wheel speed of the front wheels is equal to or lower than a predetermined value (i.e., during the start of the vehicle), and set to a value of 0 when the wheel speed of the front wheels is larger than the predetermined value (i.e., after the start of the vehicle), or when the rear-front wheel speed difference assumes a negative value (i.e., during deceleration of the vehicle). Then, the maximum value of the above first to third front-wheel distribution torques is determined to be a final control value, based on which the variable torque clutches are driven to control the engagement forces thereof to thereby control the torque distribution to the front wheels.

According to the proposed prior art driving force control system, the torque distributed to the front wheels is calculated based on the above-mentioned three parameters: the rear-front wheel speed difference, the oil temperature, and the throttle opening. Therefore, it is impossible to perform delicate or fine control of torque distribution to the front wheels based on a state of slippage of the individual rear wheels. As a result, when the vehicle is being started on a road surface having a small frictional resistance $\mu$ (hereinafter referred to as "low-$\mu$ road surface", such as an icy road surface), for instance, only one of the rear wheels might undergo slippage, but the system cannot perform the driving force control such that suitable torque distribution to the front wheels is effected in response to this slipping condition of one rear wheel, which makes it impossible for the vehicle to start smoothly. Further, the throttle opening indicates a driver demand for acceleration, but does not faithfully reflect an actual accelerating condition of the vehicle, so that the torque distribution to the front wheels cannot be properly carried out accordingly to the actual accelerating condition of the vehicle. This sometimes results in an insufficient torque distribution to the front wheels, or inversely, an excessive torque distribution to the same, which leads to decreased response of the vehicle and degraded fuel economy.

SUMMARY OF THE INVENTION

It is an object of the invention to provide a driving force control system for a four-wheel drive vehicle, which enables the vehicle to smoothly start on a low-$\mu$ road surface, and is capable of distributing only the required amounts of driving forces to auxiliary drive wheels depending on an actual accelerating condition of the vehicle, thereby improving the response and fuel economy of the vehicle.

To attain the above object, according to a first aspect of the invention, there is provided a driving force control system for a four-wheel drive vehicle including a pair of front wheels, and a pair of rear wheels, one of the pairs being main drive wheels, and another of the pairs being auxiliary drive wheels, the driving force control system controlling engagement forces of clutches to thereby control driving forces distributed to the auxiliary drive wheels.

The driving force control system according to the first aspect of the invention comprises:

driving force control means for controlling the engagement forces of the clutches such that the driving forces are distributed to the auxiliary drive wheels, on condition that there is satisfied at least one of the following conditions that a wheel speed of one of the main drive wheels is equal to or higher than a first predetermined speed, and at the same time, a wheel speed of another of the main drive wheels is lower than the first predetermined speed, and that an average wheel speed of the main drive wheels is equal to or higher than a second predetermined speed, and at the same time, an average wheel speed of the auxiliary drive wheels is lower than the second predetermined speed, until the average wheel speed of the auxiliary drive wheels reaches a third predetermined speed equal to or higher than the second predetermined speed.

According to this driving force control system for a four-wheel drive vehicle, when the wheel speed of one of the main drive wheels is equal to or higher than the first predetermined speed, and at the same time, the wheel speed of another of the main drive wheels is lower than the first predetermined speed, i.e., when one of the main drive wheels is slipping, driving forces are distributed to the auxiliary drive wheels until the average wheel speed of the auxiliary drive wheels reaches the third predetermined speed. Thus, the control of distribution of the driving forces to the auxiliary drive wheels can be delicately or finely carried out depending on a slipping condition of each of the individual main drive wheels. Further, even when the wheel speeds of the respective main drive wheels are equal to each other, if the average wheel speed of the main drive wheels is equal to or higher than the second predetermined speed, and at the same time, the average wheel speed of the auxiliary drive wheels is lower than the second predetermined speed, i.e., when both the main drive wheels are slipping, driving forces are distributed to the auxiliary drive wheels until the average wheel speed of the auxiliary drive wheels reaches the third predetermined speed. This make it possible to carry out control of distribution of the driving forces to the auxiliary drive wheels delicately or finely depending on a slipping condition of both of the main drive wheels, and hence enables the vehicle to smoothly start even on a low-$\mu$ road surface.

To attain the above object, according to a second aspect of the invention, there is provided a driving force control system for a four-wheel drive vehicle including a pair of front wheels, and a pair of rear wheels, one of the pairs being main drive wheels, and another of the pairs being auxiliary drive wheels, the driving force control system controlling engagement forces of clutches to thereby control driving forces distributed to the auxiliary drive wheels.

The driving force control system according to the second aspect of the invention comprises:

vehicle acceleration-calculating means for calculating a vehicle acceleration of the vehicle based on a demanded driving force demanded by the main drive wheels; and driving force-calculating means for calculating the driving forces to be distributed to the auxiliary drive wheels based on the calculate vehicle acceleration.

According to this driving force control system for a four-wheel drive vehicle, the vehicle acceleration of the vehicle is calculated based on a demanded driving force demanded by the main drive wheels. Based on the calculated vehicle acceleration, the driving forces to be distributed to the auxiliary drive wheels are calculated, and the engagement forces of the clutches are controlled such that the calculated driving forces are distributed to the auxiliary drive wheels. Thus, based on the demanded driving force actually demanded by the main drive wheels, the vehicle acceleration is calculated, which can faithfully reflect an actual accelerating condition of the vehicle on the calculated driving forces. Therefore, because the driving forces to be distributed to the auxiliary drive wheels are calculated based the vehicle acceleration calculated as described above, differently from conventional cases where the driving forces are calculated based on the throttle opening, only the required amounts of the driving forces can be distributed to the auxiliary drive wheels while taking the actual accelerating condition of the vehicle into account. This makes it possible to improve the response and fuel economy of the vehicle.

Preferably, the driving force control system further includes driving force-increasing means for increasing the driving forces distributed to the auxiliary drive wheels, on condition that there is satisfied at least one of the following conditions that a wheel speed of one of the main drive wheels is equal to or higher than a first predetermined speed, and at the same time, a wheel speed of another of the main drive wheels is lower than the first predetermined speed, and that an average wheel speed of the main drive wheels is equal to or higher than a second predetermined speed, and at the same time, an average wheel speed of the auxiliary drive wheels is lower than the second predetermined speed, until the average wheel speed of the auxiliary drive wheels reaches a third predetermined speed equal to or higher than the second predetermined speed.

According to this preferred embodiment, when wheel speeds of the respective main drive wheels are different from each other, or the average wheel speed of the main drive wheels is higher than that of the auxiliary drive wheels, i.e. when one or both of the main drive wheels is/are slipping, the driving forces distributed to the auxiliary drive wheels are increased until the average wheel speed of the auxiliary drive wheels reaches the third predetermined speed. Therefore, when the vehicle is starting on an icy road surface, and the vehicle acceleration is small due to a small throttle opening, for instance, if one or both of the main drive wheels is/are slipping, the driving forces distributed to the auxiliary drive wheels are increased, thereby enabling the vehicle to start smoothly. As a result, the startability of the four-wheel drive vehicle can be further improved.

More preferably, the driving force-increasing means includes progressively-increasing means for progressively increasing the driving forces distributed to the auxiliary drive wheels with the lapse of time.

More preferably, the driving force control system further includes driving force-progressively decreasing means for progressively decreasing the driving forces distributed to the auxiliary drive wheels with the lapse of time, after the average wheel speed of the auxiliary drive wheels reaches the third predetermined speed.

Preferably, the driving force control system further includes vehicle speed detection means for detecting a vehicle speed of the vehicle, and correction means for correcting the driving forces for prevention of tight turn, such that the driving forces are made smaller as the vehicle speed detected by the vehicle speed detection means is larger, and at the same time that the driving forces are made larger as the demanded driving force is larger.

Preferably, the demanded driving force is calculated based on a basic driving force calculated based on an engine rotational speed and an intake pipe absolute pressure, by using a coefficient corresponding to a gear ratio of the vehicle, and a correction term corresponding to an inertial force of the vehicle.

Preferably, the vehicle acceleration-calculating means calculates the vehicle acceleration by subtracting a value corresponding to a running resistance of the vehicle from a vehicle acceleration value calculated based on the demanded driving force.

The above and other objects, features, and advantages of the invention will become apparent from the following detailed description taken in conjunction with the accompanying drawings.

DETAILED DESCRIPTION OF THE PREFERRED EMBODIMENT

The invention will now be described in detail with reference to the drawings showing an embodiment thereof.

Figure 1:
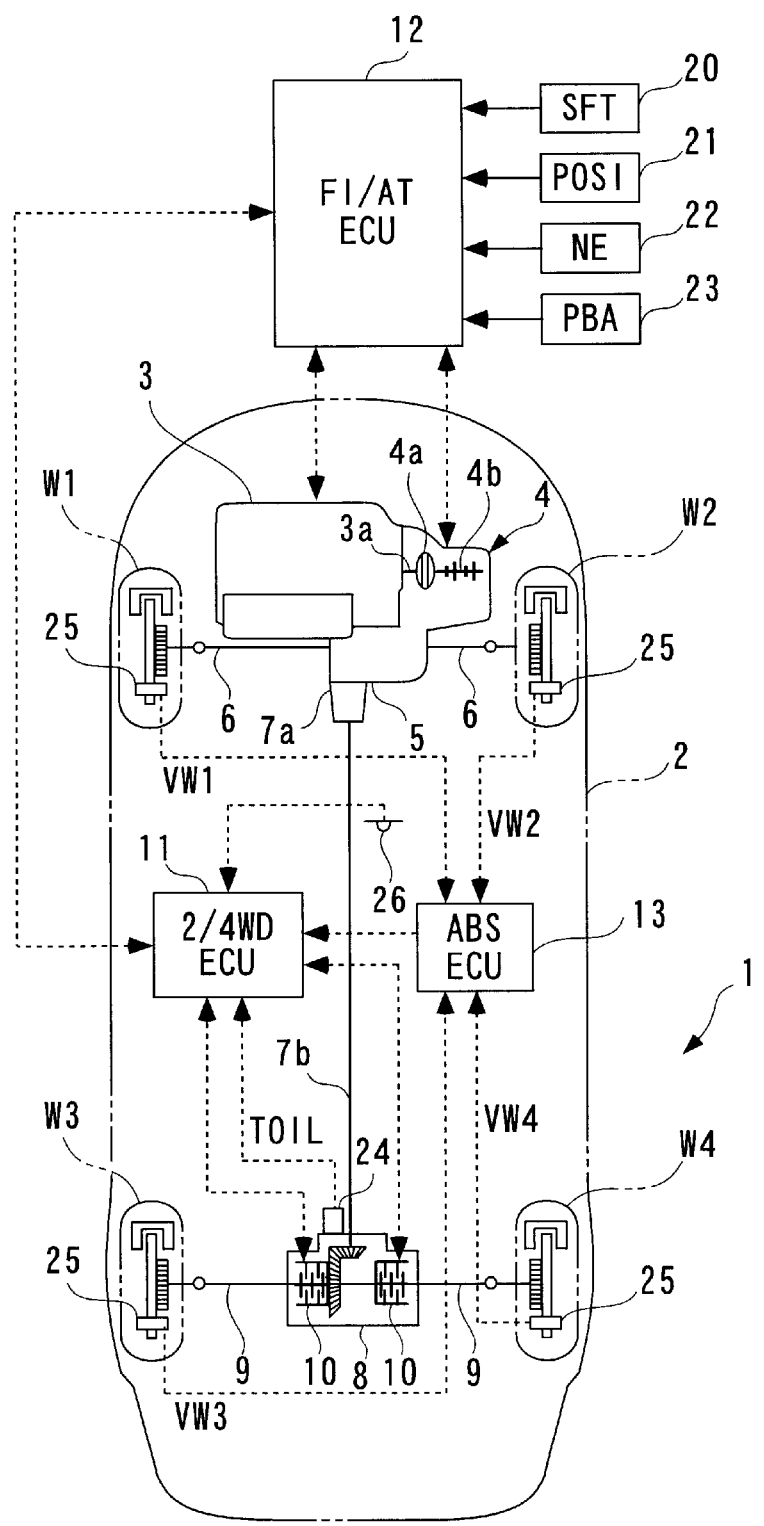
FIG. 1 is a view schematically showing the whole arrangement of a four-wheel drive vehicle incorporating a driving force control system according to an embodiment of the invention.

FIG. 1 schematically shows the whole arrangement of a four-wheel drive vehicle 2 incorporating a driving force control system 1 according to an embodiment of the invention. As shown in the figure, the four-wheel drive vehicle 2 (hereinafter simply referred to as "the vehicle 2") includes an engine 3 transversely mounted in a front portion thereof and an automatic transmission 4 integrally arranged with the engine 3.

The automatic transmission 4 is comprised of a torque converter 4a connected to an output shaft 3a of the engine 3, a shift lever, not shown, which is capable of selecting any one of the eight shift positions of "1, 2, 3, D4, D5, N, R, and P", and a gear mechanism 4b, partly shown, which can be shifted to any of six gear positions having respective change gear ratios, i.e. first to fifth speed positions and a reverse gear position. In the automatic transmission, when the shift position is set to "1" to "D5", and "R", the gear position of the automatic transmission 4 is switched to the first speed position, a range of the first and second speed positions, a range of the first to third speed positions, a range of the first to fourth speed positions, a range of the first to fifth speed positions, and the reverse gear position, respectively.

The automatic transmission 4 has a gear position sensor 20 and a shift position sensor 21 mounted therein. The gear position sensor 20 detects a gear position, and delivers a signal SFT indicative of the detected gear position to an FI/AT·ECU12, referred to hereinafter. More specifically, the gear position signal SFT assumes any one of values (hereinafter referred to as "SFT values") of "1" to "5", and "6", for the first to fifth speed positions and the reverse gear position, respectively.

On the other hand, the shift position sensor 21 senses a selected shift position and delivers a shift position signal POSI indicative of the sensed shift position to the FI/AT·ECU 12. More specifically, the shift position signal POSI assumes a value of "1" for the shift position of "N" or "P", a value of "2" for the shift position of "R", and values of 3 to 7 for the respective shift positions of "1" to "D5" (hereinafter, the value of the shift position signal POSI will be referred to as "the POSI value"). Further, when the automatic transmission 4 is in "no-position" (state in which the shift position of the automatic transmission 4 cannot be identified since the shift lever is located between shift positions), the POSI value is "0".

The above FI/AT·ECU 12 is formed or implemented by a microcomputer including a RAM, a ROM, a CPU, and an I/O interface, none of which are shown, and controls the operation of the engine 3 and that of the automatic transmission 4. Connected to this FI/AT·ECU 12 are an engine rotational speed sensor 22 and an intake pipe absolute pressure sensor 23. The respective sensors 22, 23 sense an engine rotational speed NE and an intake pipe absolute pressure PBA, and deliver signals indicative of the sensed engine rotational speed NE and intake pipe absolute pressure PBA to the FI/AT·ECU 12.

The engine 3 has the output shaft 3a thereof connected to left and right front wheels W1, W2 as main drive wheels via the automatic transmission 4, a front differential 5 and front drive shafts 6, 6. Further, the output shaft 3a is connected to left and right rear wheels W3, W4 as auxiliary drive wheels via the automatic transmission 4, the front differential 5, a transfer 7a, a propeller shaft 7b, a rear differential 8, and left and right rear drive shafts 9, 9.

The rear differential 8 includes left and right electromagnetic clutches 10, 10. Each of the electromagnetic clutches 10, 10 connects and disconnects the propeller shaft 7b to and from a corresponding one of the rear drive shafts 9 associated therewith. When the electromagnetic clutches 10, 10 disconnect the propeller shaft 7b from the rear drive shafts 9, all the drive torque from the engine 3 is transmitted to the front wheels W1, W2, whereby the vehicle is set to a front-wheel drive mode. On the other hand, when the electromagnetic clutches 10, 10 connect the propeller shaft 7b to the rear drive shafts 9, 9, the drive torque of the engine 3 is also transmitted or distributed to the rear wheels W3, W4, whereby the vehicle is set to a four-wheel drive mode. Further, the electromagnetic clutches 10, 10 are configured such that the engagement force of each of them is continuously changed in response to a drive signal (current pulse) from a 2/4WD·ECU 11, referred to hereinafter, whereby drive torques transmitted to the left and right rear wheels W3, W4 are controlled independently of each other.

The rear differential 8 is provided with an oil temperature sensor 24 which senses a temperature (oil temperature) TOIL of lubricating oil lubricating the electromagnetic clutches 10, 10, and delivers a signal indicative of the sensed oil temperature TOIL to the 2/4WD·ECU 11.

Further, a wheel speed sensor 25 is mounted to each of the front and rear wheels W1 to W4. The four wheel speed sensors 25 sense wheel speeds VW1 to VW4 of the wheels W1 to W4, respectively, and deliver signals indicative of the sensed wheel speeds VW1 to VW4 to an ABS ECU 13. The ABS ECU 13 is formed by a microcomputer, similarly to the FI/AT·ECU 12 described above, and carries out anti-lock control of the front and rear wheels W1 to W4.

On a dashboard, not shown, there is provided a lock switch 26. The lock switch 26 is provided for execution of a lock mode control for locking the rear differential 8. When the switch 26 is depressed by the driver, a lock switch signal indicative of the depressed state is delivered to the 2/4WD·ECU 11.

The driving force control system 1 includes the 2/4WD·ECU (driving force control means, vehicle acceleration-calculating means, driving force-calculating means, driving force-increasing means) 11. The 2/4WD·ECU 11 is formed by a microcomputer, similarly to the FI/AT·ECU 12 and the ABS·ECU 13, and connected to the ECU's 12, 13. The signals from the sensors 20 to 25 are input to the 2/4WD·ECU 11 by serial communication between the 2/4WD·ECU 11 and the ECU's 12, 13. In response to these signals and the above-mentioned lock switch signal, the 2/4WD·ECU 11 executes a driving force control process for controlling the driving forces (drive torques) distributed to the rear wheels W3, W4, as described in the following, based on control programs read from the ROM, by using flag values and calculation values, referred to hereinafter, read from the RAM.

Figure 2:
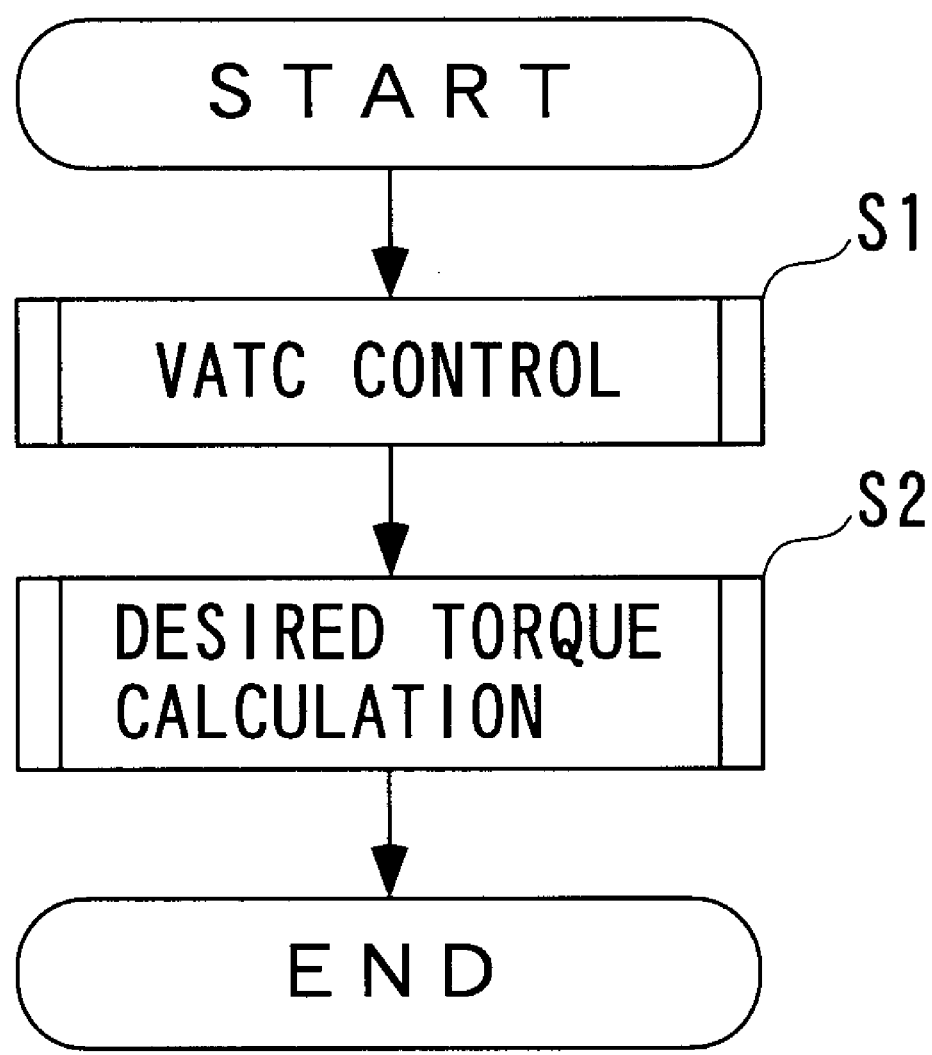
FIG. 2 is a flowchart showing a main routine for carrying out a driving force control process.

In the following, the driving force control process executed by the 2/4WD ECU 11 will be described. FIG. 2 shows a main routine for carrying out the driving force control process.

As shown in FIG. 2, in this process, first, a VATC control process is carried out at a step S1. In this process, as described in detail hereinafter, by executing a drive torque-calculating process, a front-rear distribution torque control process, and a control amount-limiting process, a final desired VATC torque value TOBJM (driving force) of a VATC torque to be distributed to each of the left and right rear wheels W3, W4 is calculated based on an accelerating condition of the vehicle 2, etc.

At the following step S2, a desired torque calculation process is carried out, followed by terminating the main routine. Although a detailed description is omitted, in this desired torque calculation process, final desired torques MDTL, MDTR to be distributed or allocated to the left and right rear wheels W3, W4 are calculated based on the final desired VATC torque value TOBJM. Then, the 2/4WD ECU 11 supplies drive signals (pulse currents) commensurate with these desired torques to the electromagnetic clutches 10, 10, to thereby control the engagement forces of these clutches. This distributes or allocates desired torques MDTL, MDTR to the left and right rear wheels W3, W4, and remaining torques obtained by subtracting the desired torques MDTL, MDTR from a drive torque TD, referred to hereinafter, are distributed or allocated to the front wheels W1, W2. As a result, when the desired torques MDTL, MDTR assume values other than 0, the vehicle is set to the four-wheel drive mode, whereas when the same assume the value of 0, the vehicle is set to the front-wheel drive mode(two-wheel drive mode).

Next, the aforementioned VATC control process executed at the step S1 will be described in more detail.

Figure 3:
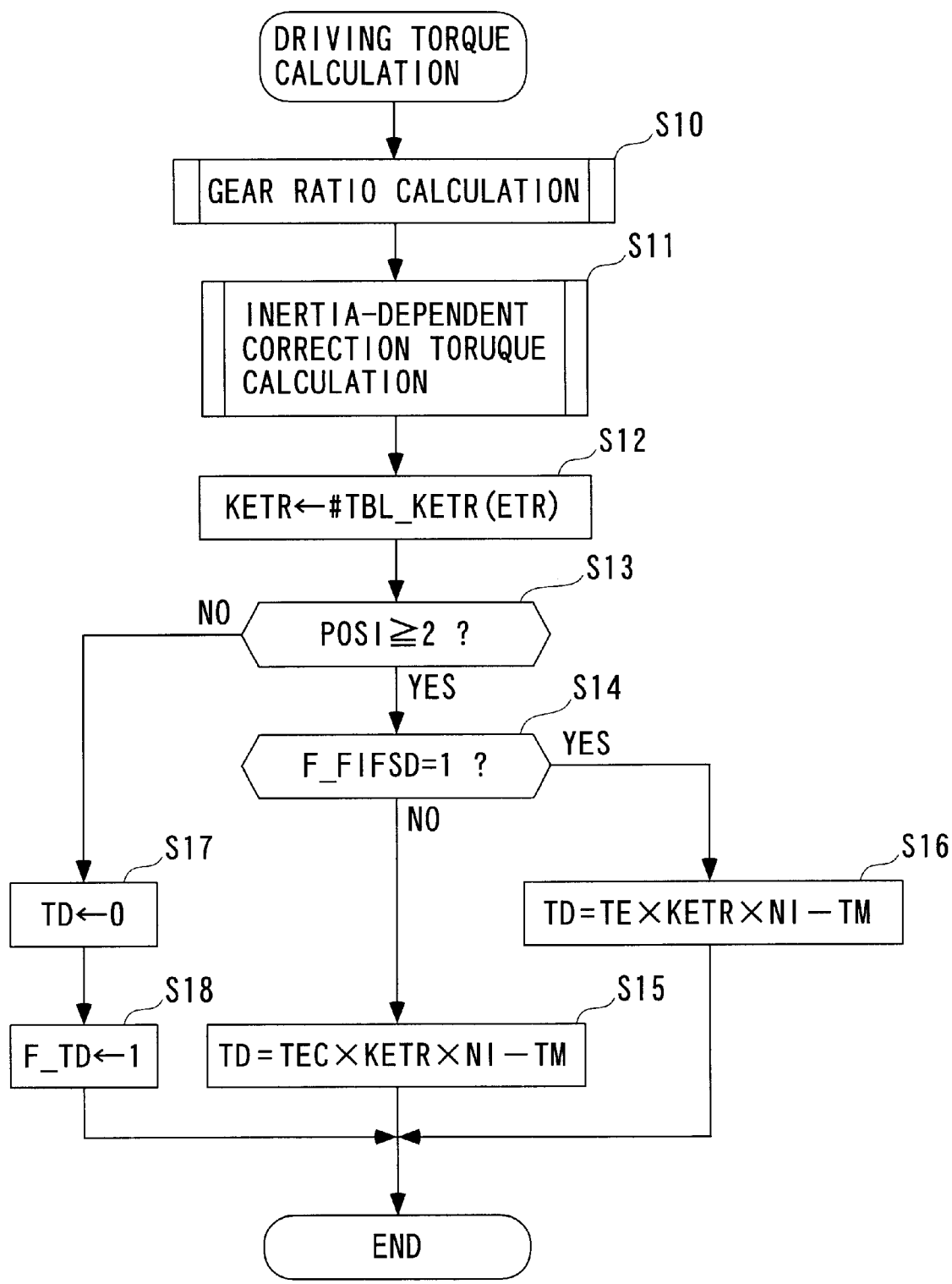
FIG. 3 is a flowchart showing a main routine for carrying out a drive torque-calculating process included in a VATC control process.

First, a description will be made of the drive torque-calculating process included in the VATC control process. The drive torque-calculating process is executed to calculate a drive torque (demanded torque) TD output from the output shaft of the automatic transmission 4, based on an engine torque TEC output from the engine 3. FIG. 3 shows a main routine for the drive torque calculation, which is executed by an interrupt handling routine at predetermined time intervals according to the settings of a program timer.

As shown in FIG. 3, in the drive torque-calculating process, first, a gear ratio N1 is calculated by a gear ratio-calculating process at a step S10, which will be described in detail hereinafter.

Then, the program proceeds to a step S1, wherein an inertia-dependent correction torque TM is calculated by an inertia-dependent correction torque-calculating process, which will also be described in detail hereinafter. The inertia-dependent correction torque TM is of a correction amount for causing gear position dependency of torque required for rotating of the wheels W1 to W4 in acceleration of the vehicle 2 to reflect on the calculation of the drive torque TD, since the required torque varies with the gear position of the vehicle 2.

Figure 4:
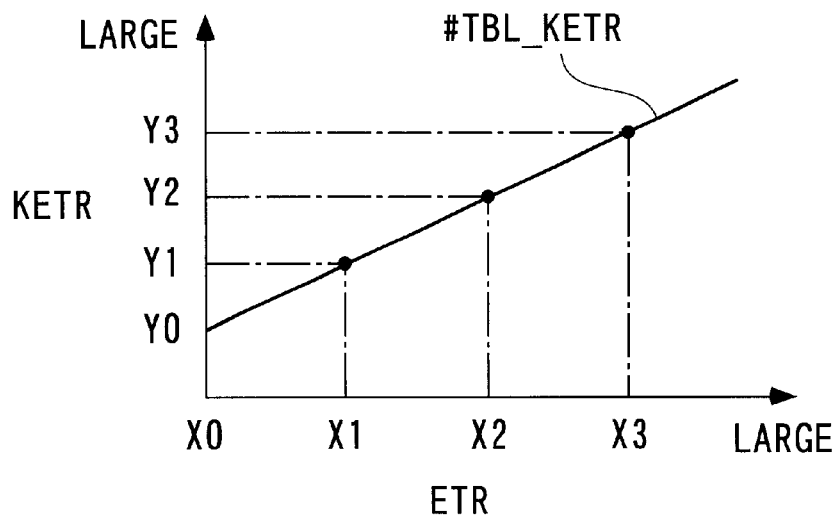
FIG. 4 is a diagram showing an example of an ETR-KETR table.

Then, the program proceeds to a step S12, wherein a table value #TBL__KETR is retrieved from an ETR-KETR table an example of which is shown in FIG. 4 according the output/input rotational speed ratio ETR of the torque converter 4a, and set to a toque converter-dependent amplification factor KETR.

As shown in FIG. 4, the table value #TBL__KETR is linear or proportional to the output/input rotational speed ratio ETR, that is, the ETR-KETR table is configured such that the table value #TBL__KETR becomes larger as the output/input rotational speed ratio ETR is larger. It should be noted that a straight line in FIG. 4 indicates the table value #TBL__KETR and that a symbol "#TBL__KETR (ETR)" at the step S12 in FIG. 3 indicates that the table value #TBL__KETR is determined according to the output/input rotational speed ratio ETR. Similar symbols in the following flowcharts should be interpreted similarly.

Then, the program proceeds to a step S13, wherein it is determined whether or not the POSI value is equal to or larger than 2. If the answer to the question is affirmative (YES), i.e. if the shift position is one of "1" to "D5" and "R", the program proceeds to a step S14, wherein it is determined whether or not a fail-safe flag F__FIFSD assumes "1". The fail-safe flag F__FIFSD is set to "1" when abnormality of the engine 3 is detected, and otherwise, it is set to "0".

If the answer to the question of the step S14 is negative (NO), i.e. if the engine 3 is normally operating, at the following step S15, the drive torque TD is calculated based on the gear ratio NI, the inertia-dependent correction torque TM, and the toque converter-dependent amplification factor KETR by using the following equation:

$$TD = TEC \times KETR \times NI - TM \qquad (1)$$

wherein TEC represents a value of a basic engine torque TE calculated based on the intake pipe absolute pressure PBA and the engine rotational speed NE, which is corrected e.g. in dependence on various parameters, such as the engine coolant temperature and intake air temperature, followed by terminating the program.

On the other hand, if the answer to the question of the step S14 is affirmative (YES), i.e. if abnormality of the engine is detected, at a step S16, the drive torque TD is calculated by using the following equation:

$$TD = TE \times KETR \times NI - TM \qquad (2)$$

Then, the program is terminated.

If the answer to the question of the step S13 is negative (NO), which means that the shift position is "N" or "P", or the shift lever is in the no-position state, the program proceeds to a step S17, wherein the value of the drive torque TD is set to "0". Further, at a step S18, a drive torque flag F_TD is set to "1", followed by terminating the program. The drive torque flag F_TD is set to "1" when the drive torque TD is equal to or lower than 0, i.e. during stoppage or deceleration of the vehicle, whereas it is set to "0" when the drive torque TD is equal to or larger than 0, i.e. during acceleration of the vehicle.

Figure 5:
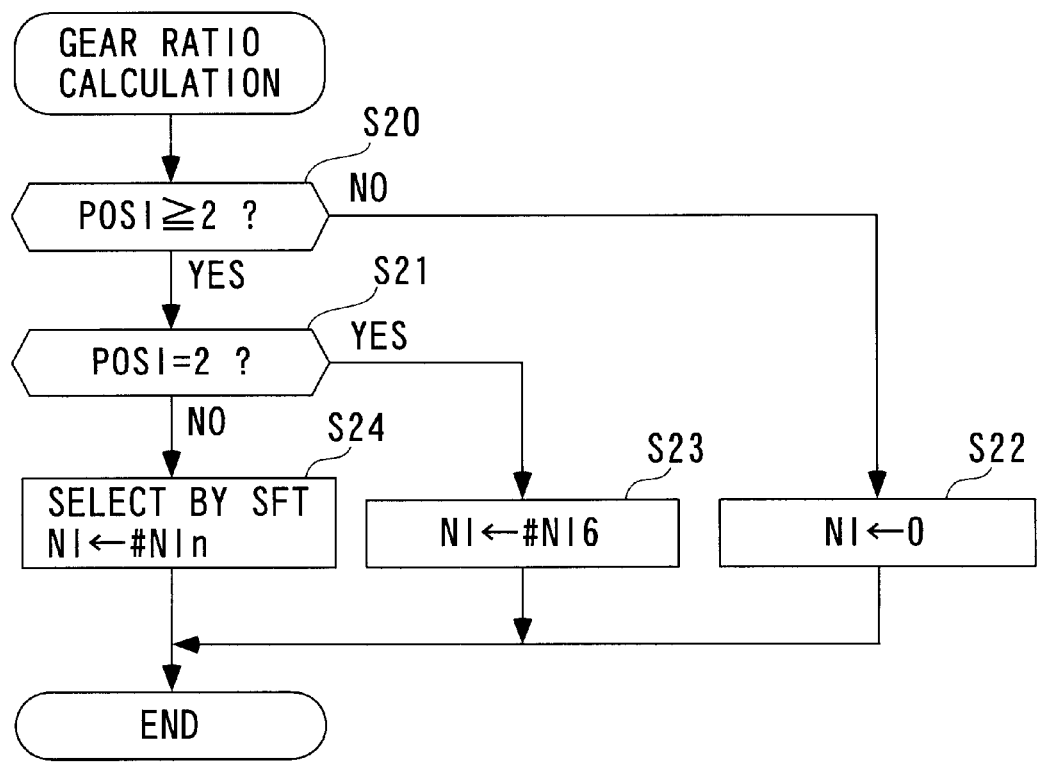
FIG. 5 is a flowchart showing a routine for carrying out a gear ratio-calculating process which is executed at a step S10 in FIG. 3.

Next, the gear ratio-calculating process executed at the step S10 in FIG. 3 will be described with reference to FIG. 5. The process is executed to calculate a gear ratio NI based on the POSI value and the SFT value.

In the gear ratio-calculating process, first, it is determined at a step S20 whether or not the POSI value is equal to or larger than 2. If the answer to the question is negative (NO), i.e. if POSI=1 or 0 holds, which means that the shift position is "N" or "P" or the shift lever is in the no-position state, the gear ratio NI is set to 0 at a step S22, followed by terminating the program.

On the other hand, if the answer to the question of the step S20 is affirmative (YES), the program proceeds to a step S21, wherein it is determined whether or not POSI=2 holds. If the answer to the question is affirmative (YES), i.e. if the shift position is "R", the gear ratio NI is set to a predetermined value #N16 for reverse drive operation of the vehicle at a step S23, followed by terminating the program.

If the answer to the question of the step S21 is negative (NO), i.e. if POSI≧3 holds, the program proceeds to a step S24, and the gear ratio NI is set to one of predetermined values #NIn (n=1 to 5) for forward drive operation of the vehicle, which is selected according to the SFT value, followed by terminating the program. In this case, the predetermined values #NI1 to NI5 are set in a manner corresponding to the values 1 to 5 of the SFT value, respectively, and such that as the gear position is lower, the corresponding predetermined value #NIn is larger.

Figure 6:
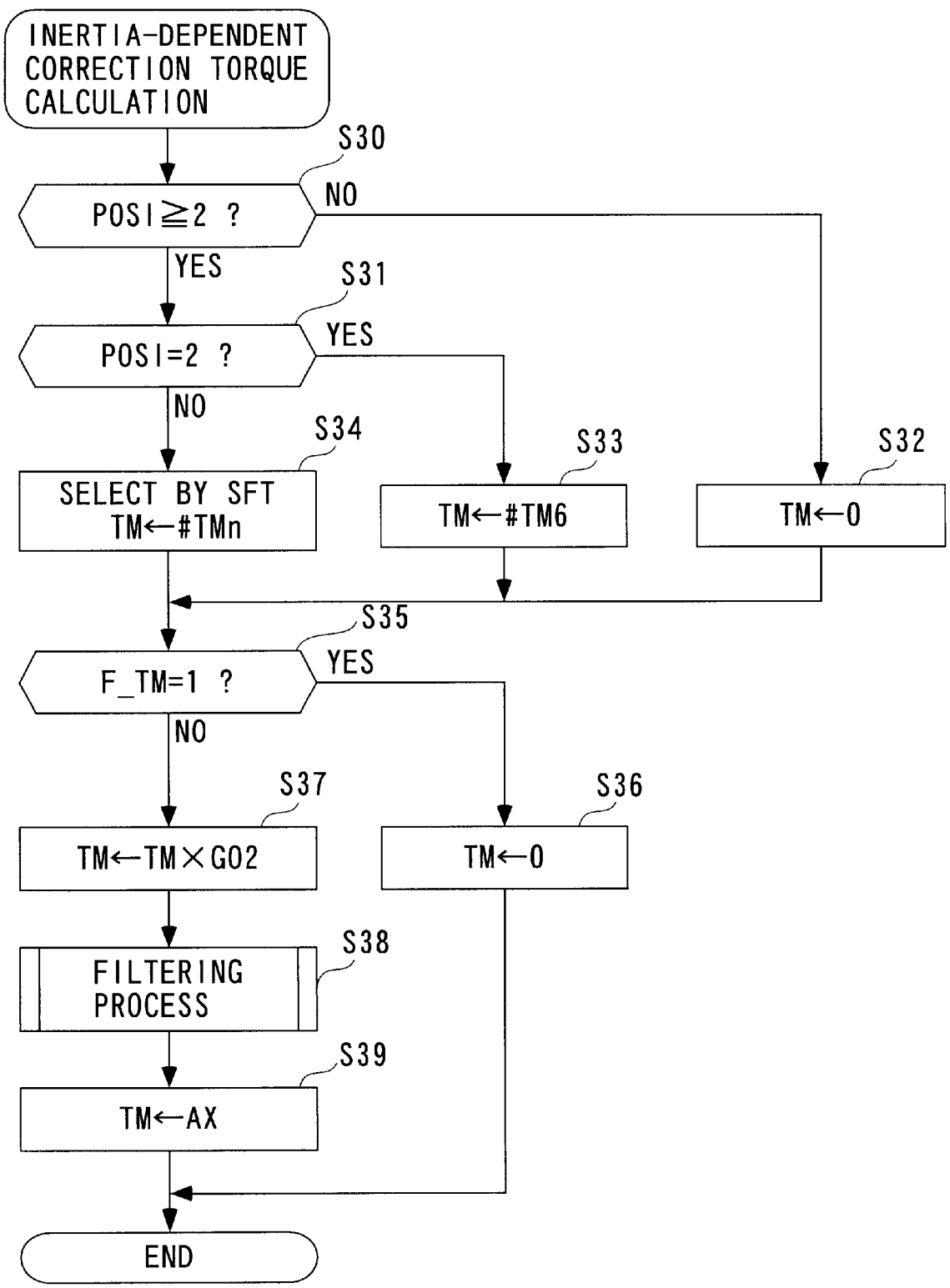
FIG. 6 is a flowchart showing a routine for carrying out an inertia-dependent correction torque-calculating process which is executed at a step S11 in FIG. 3.

Next, the inertia-dependent correction torque-calculating process executed at the step S11 will be described with reference to FIG. 6. This process is executed to calculate the inertia-dependent correction torque TM based on the POSI value, the SFT value, and an average front-wheel acceleration GO2.

As shown in the figure, in the process, first at steps S30 to 34, the inertia-dependent correction torque TM is calculated based on the POSI value and the SFT value similarly to calculation of the gear ratio NI.

More specifically, if POSI=1 or 0 holds at the step S30, the inertia-dependent correction torque TM is set to 0 at a step S32.

If POSI=2 holds at the steps S30 and S31, the inertia-dependent correction torque TM is set to a predetermined value #TM6 for reverse drive operation of the vehicle at a step S33.

Further, if POSI≧3 holds at the step S30 and S31, the inertia-dependent correction torque TM is set to one of predetermined values #TMn (n=1 to 5) for forward drive operation of the vehicle at the step S34. In this case, similarly to the predetermined values #NI1 to NI5 used in the gear ratio-calculating process, the predetermined values #TM1 to TM5 are set in a manner corresponding to the values 1 to 5 of the SFT value, respectively, and such that as the gear position is lower, the corresponding predetermined value #TMn is larger.

At a step S35 following the above steps S32 to S34, it is determined whether or not a flag F_TM assumes "1". The flag F_TM is set to "1" when the average front-wheel acceleration GO2 is equal to or lower than "0", and set to "0" when the average front-wheel acceleration GO2 is higher than "0". The average front-wheel acceleration GO2 is calculated by determining a left front-wheel acceleration GOL from a difference between the present value VW1n of a left front-wheel speed VW1 and the immediately preceding value of the same and a right front-wheel acceleration GOR similarly to the left front-wheel acceleration GOL, and then averaging the left front-wheel acceleration GOL and the right front-wheel acceleration GOR.

If the answer to the question of the step S35 is affirmative (YES), i.e., if the vehicle is decelerating or in stoppage, the inertia-dependent correction torque TM is set to 0 at a step S36, followed by terminating the program.

On the other hand, if the answer to the question of the step S35 is negative (NO), i.e., if the vehicle is accelerating, at a step S37, the inertia-dependent correction torque TM is set to a value obtained by multiplying the inertia-dependent correction torque TM obtained at the steps S32 to S34 by the average front-wheel acceleration GO2.

Then, the program proceeds to a step S38, wherein a filtered value AX of the inertia-dependent correction torque TM is determined by subjecting the inertia-dependent correction torque TM obtained at the step S37 to low-pass filtering. Then, at the following step S39, the inertia-dependent correction torque TM is set to the filtered value AX determined at the step S38, followed by terminating the program.

Figure 7:
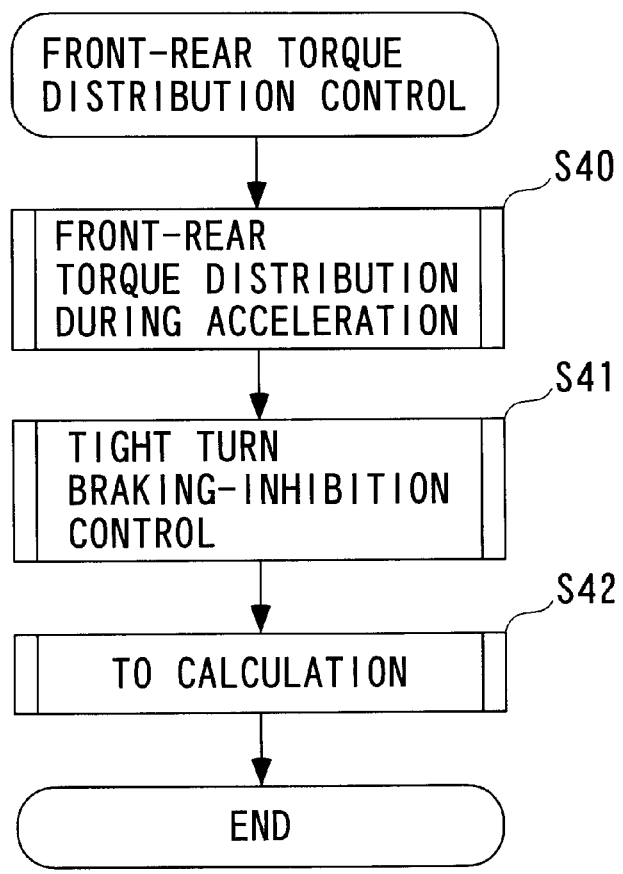
FIG. 7 is a flowchart showing a main routine for carrying out a front-rear distribution torque control process included in the VATC control process.

Next, a description will be made of a front-rear distribution torque control process included in the VATC control process. This process is executed to calculate a VATC torque TO. FIG. 7 shows a main routine for carrying out the front-rear distribution torque control process, which is executed by an interrupt handling routine at predetermined time intervals according to the settings of a program timer.

As shown in FIG. 7, in this process, first, a front-rear torque-distributing process during acceleration is carried out at a step S40. In this process, an intermediate VATC torque value T1 is calculated as described hereinbelow.

At the following step S41, a tight turn braking-inhibiting control process is executed. In the process, a tight turn braking-inhibiting coefficient T4 is calculated as described hereinafter.

Figure 8:
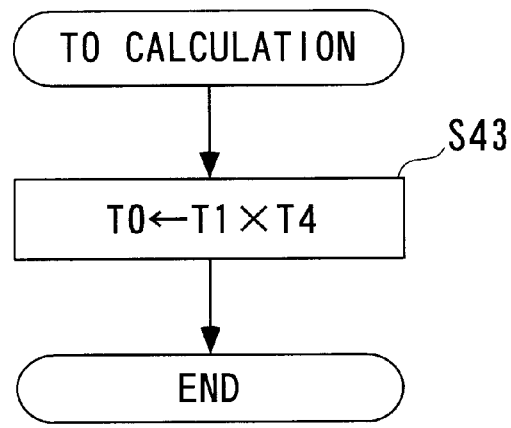
FIG. 8 is a flowchart showing a routine for carrying out a T0-calculating process which is executed at a step S42 in FIG. 7.

At the final step S42, a T0-calculating process is executed. In this process, as shown in FIG. 8, at a step S43, the intermediate VATC torque value (driving force) T1, which is determined at the step S40, is multiplied by the tight turn braking-inhibiting coefficient T4 determined at the step S41, to thereby obtain a value T1×T4, and the VATC torque T0 is set to the value T1×T4 after lower limit-checking thereof.

Figure 9:
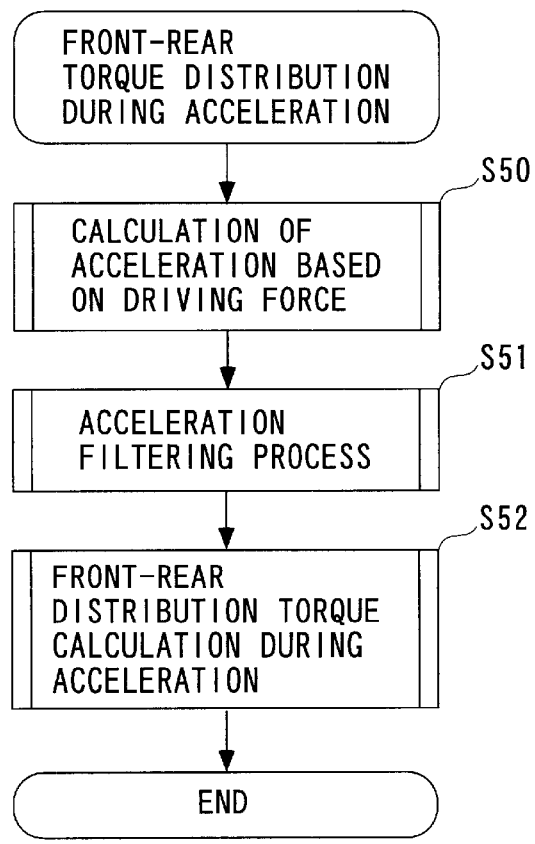
FIG. 9 is a flowchart showing a main routine for carrying out a front-rear distribution control process during acceleration which is executed at a step S40 in FIG. 7.

In the following, the front-rear torque-distributing process during acceleration, which is executed at the step S40, will be described in detail. FIG. 9 shows a main routine for carrying out the process. In this process, first, a process for calculating an acceleration based on a driving force is executed at a step S50 to calculate a vehicle acceleration XGF based on the drive torque TD.

Then, the program proceeds to a step S51, wherein an acceleration-filtering process is carried out to calculate a filtered value XGF1F of the vehicle acceleration XGF. Then, at a step S52, the intermediate VATC torque value T1 is calculated by a process for calculating front-rear distribution torque during acceleration, followed by terminating the program.

Figure 10:
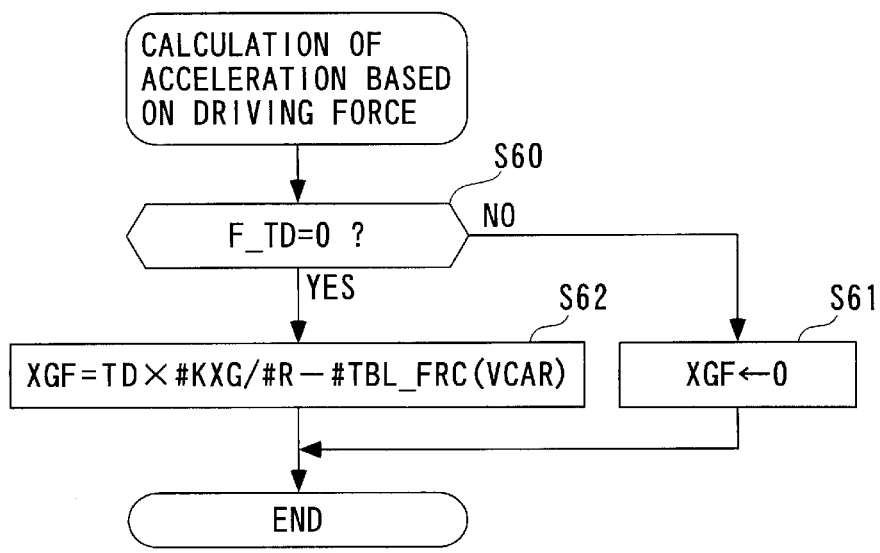
FIG. 10 is a flowchart showing a routine for carrying a process for calculating acceleration based on a driving force, which is executed at a step S50 in FIG. 9.

In the following, the process for calculating an acceleration based on a driving force, which is executed at the step S50, will be described with reference to FIG. 10. In this process, first, it is determined at a step S60 whether or not the drive torque flag F_TD assumes "0".

If the answer to the question is negative (NO), i.e,. if the vehicle is decelerating or in stoppage and hence the drive torque TD is equal to or smaller than 0 as described hereinbefore, the program proceeds to a step S61, and the vehicle acceleration XGF is set to 0, followed by terminating the program.

On the other hand, if the answer to the question of the step S60 is affirmative (YES), i.e., if the vehicle is accelerating and, hence, the drive torque TD is larger than 0, as described hereinbefore, the program proceeds to a step S62, wherein the vehicle acceleration XGF is calculated by using the following equation (3):

$$XGF = TD \times \#KXG/\#R - \#TBL\_FRC \quad (3)$$

wherein #KXG represents the reciprocal of the weight of the vehicle 2; #R represents the diameter of each of the wheels of the vehicle 2; and #TBL_FRC represents a table value of a running resistance FRC of the vehicle 2 followed by terminating the program.

Figure 11:
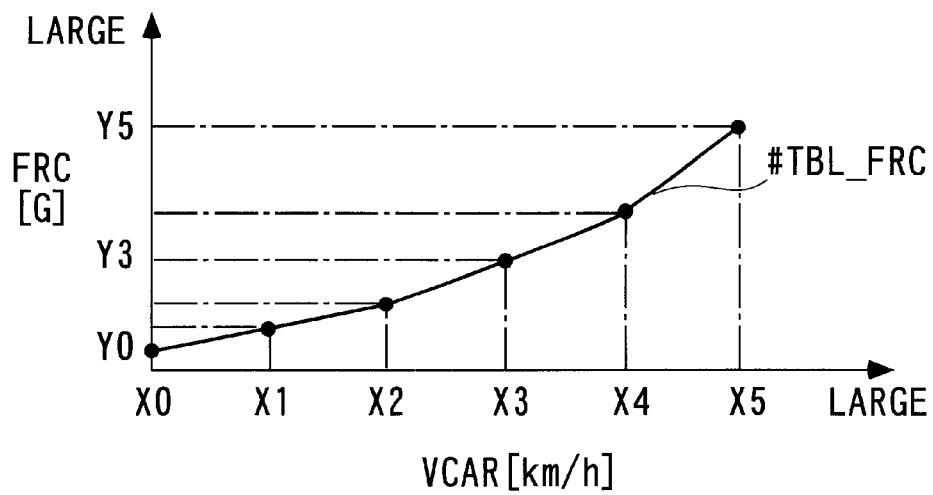
FIG. 11 is a diagram showing an example of a VCAR-FRC table.

The table value #TBL_FRC of the running resistance FRC is retrieved from a VCAR-FRC table an example of which is shown in FIG. 11, according to the vehicle speed VCAR. As shown in the figure, the VCAR-FRC table is configured such that the table value #TBL_FRC assumes a larger value as the vehicle speed VCAR is higher. It should be noted that the vehicle speed VCAR is obtained by correcting the lower one of left and right rear-wheel speeds VW3, VW4 depending on the accelerating condition or decelerating condition of the vehicle.

As described above, the vehicle acceleration XGF is calculated as a value obtained by subtracting the running resistance FRC of the vehicle 2 from a vehicle acceleration value calculated based on the drive torque TD. In other words, the vehicle acceleration XGF is calculated as a surplus vehicle acceleration used only for actual acceleration of the vehicle 2 and, hence, it faithfully reflects an actual accelerating condition of the vehicle 2.

Figure 12:
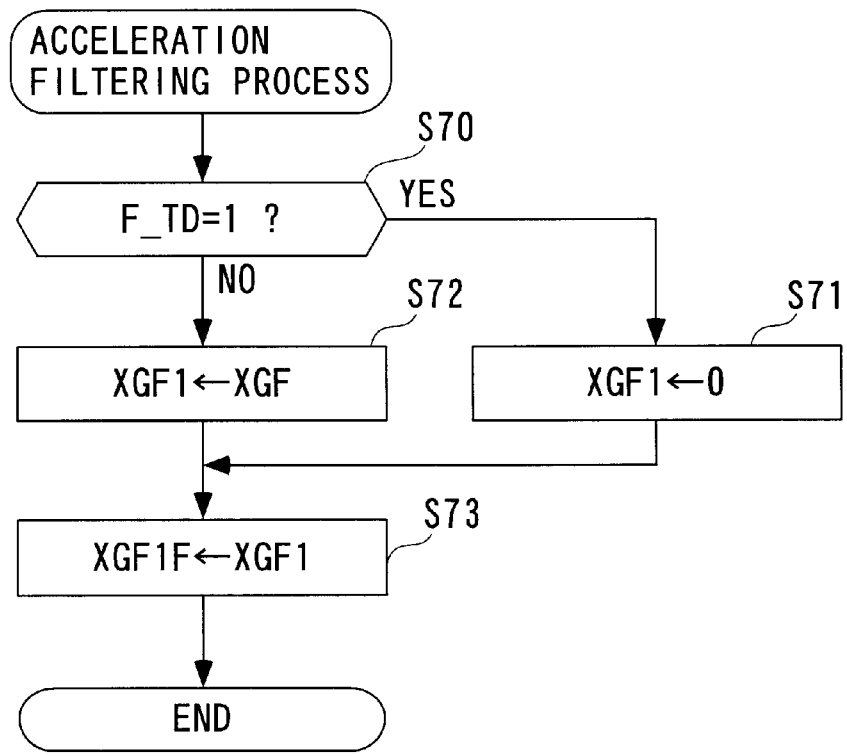
FIG. 12 is a flowchart showing a routine for carrying out an acceleration-filtering process which is executed at a step S51 in FIG. 9.

Next, the acceleration-filtering process executed at the step S51 will be described with reference to FIG. 12. As shown in the figure, in this process, if the drive torque flag F_TD assumes "1" at a step S70, i.e. if the vehicle is decelerating or in stoppage and hence the drive torque TD is equal to or smaller than 0, an intermediate value XGF1 is set to 0 at a step S71.

On the other hand, if the drive torque flag F_TD assumes "0" at the step S70, i.e. if the vehicle is accelerating and the drive torque TD is larger than 0, the intermediate value XGF1 is set to the vehicle acceleration XGF at a step S72.

At a step S73 following the steps S71, 72, a filtered vehicle acceleration XGFLF is set to the intermediate value XGF1, followed by terminating the program. As described above, the filtered vehicle acceleration XGF1F is set to the vehicle acceleration XGF during acceleration of the vehicle, whereas it is set to 0 during deceleration or stoppage of the vehicle.

Figure 13:
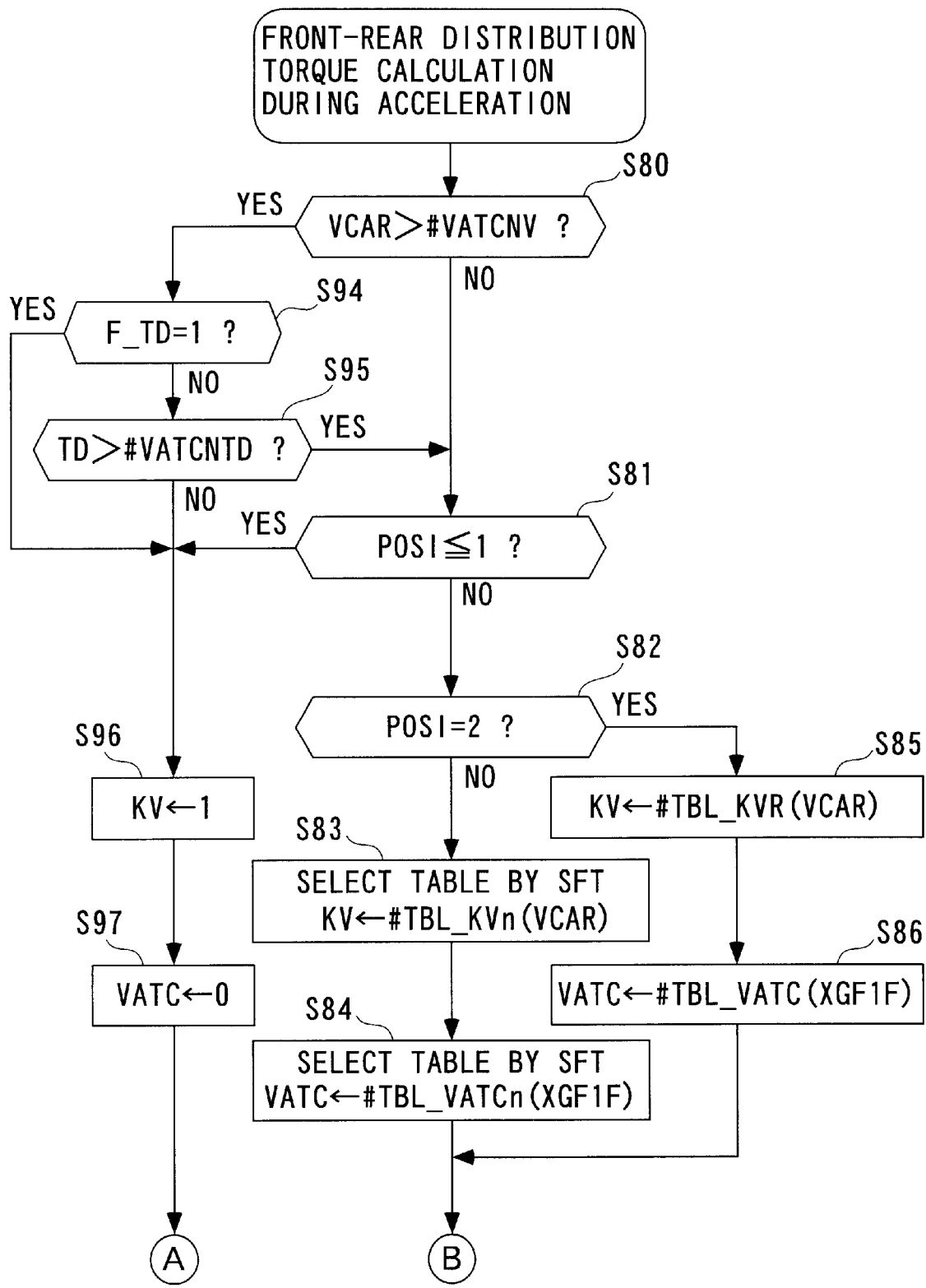
FIG. 13 is a flowchart showing a routine for carrying out part of the front-rear distribution torque-calculating process during acceleration, which is executed at a step S52 in FIG. 9.

In the following, the process for calculating the front-rear distribution torque during acceleration, which is executed at the step S52, will be described with reference to FIGS. 13 to 21. Here, a case of the vehicle 2 being started after stoppage is taken as an example, and the description will be made following a sequence of operations carried out during the start of the vehicle 2. As shown in FIG. 13, in the present process, first, it is determined at a step S80 whether or not the vehicle speed VCAR is higher than a predetermined speed #VATCNV.

During stoppage of the vehicle, VCAR=0 holds, and hence the answer to the question of the step S80 is negative (NO). Therefore, the program proceeds to a step S81, wherein it is determined whether or not the POSI value is equal to or smaller than 1. When none of the shift positions from the 1" to "D5" and "R" has been selected, the answer to this question is affirmative (YES), so that a VATC-adjusting coefficient KV is set to a value of 1 at a step S96, and then a basic VATC torque value (driving force) is set to a value of 0 at a step S97.

Figure 14:
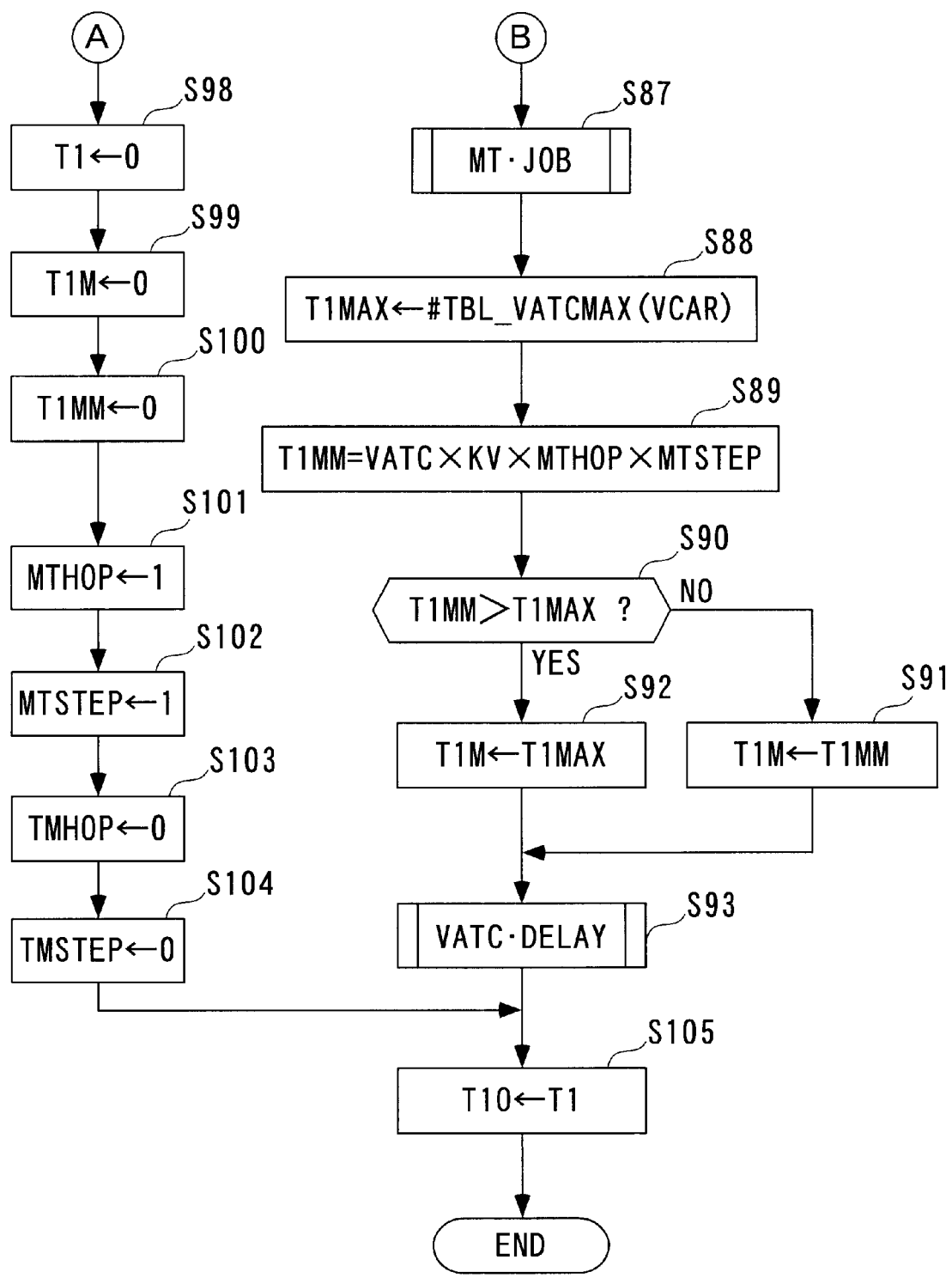
FIG. 14 is a continuation of the FIG. 13 flowchart.

Then, at respective steps S98 to S100 in FIG. 14, the immediate VATC torque value T1, a desired VATC torque value T1M and a corrected VATC torque value T1MM are set to 0. Further, a HOP correction coefficient MTHOP and a STEP correction coefficient MTSTEP are set to 1 at respective steps S101 and S102, and a count TMHOP of a HOP timer and a count TMSTEP of a STEP timer are set to 0 at respective steps S103 and S104.

Then, at a step S105, the immediately preceding value T10 of the intermediate VATC torque value T1 is updated to the intermediate VATC torque value T1 (=0) determined at a step S99, followed by terminating the program.

On the other hand, if one of shift positions "1" to "D5" and "R" is selected during stoppage of the vehicle, the answer to the question of the step S81 becomes negative (NO), so that the program proceeds to a step S82, wherein it is determined whether or not the POSI value is equal to 2.

Figure 15:
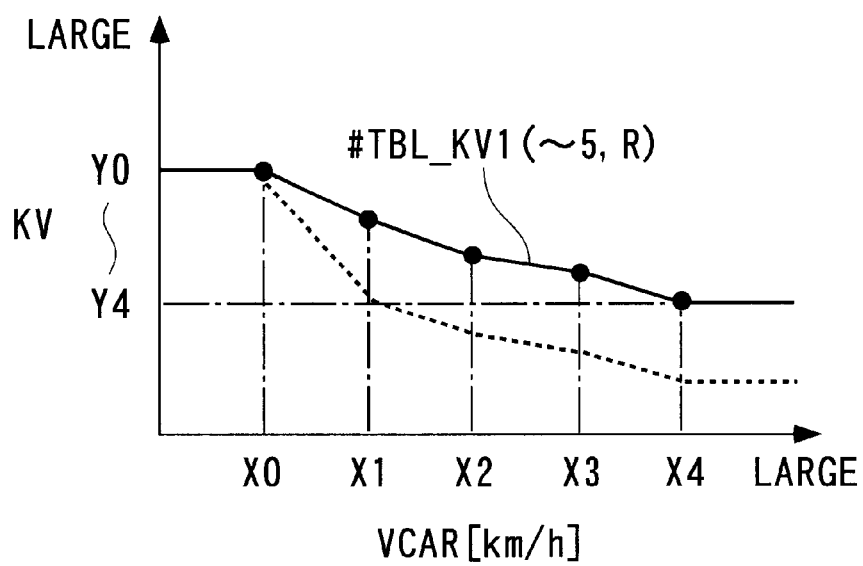
FIG. 15 is a diagram showing an example of a VCAR-KV table.

If the answer to the question is negative (NO), i.e. if a shift position for forward drive operation (i.e. one of "1" to "D5") is selected, the program proceeds to a step S83, wherein a table value #TBL_KVn (n=1 to 5) of the VATC-adjusting coefficient KV is retrieved from a VCAR-KV table an example of which is shown in FIG. 15 according to the vehicle speed VCAR and the SFT value, and set to the VATC-adjusting coefficient KV.

There are provided five kinds of VCAR-KV tables for the first to fifth speed positions indicated by the respective SFT values 1 to 5. FIG. 15 shows the VCAR-KV table for the first speed position. As shown in the figure, the table value #TBL_KV1 assumes a predetermined value Y0 for a predetermined value X0 and values lower than X0 of the vehicle speed VCAR, and assumes a predetermined value Y4 lower than the predetermined value Y0 for a predetermined speed X4 and values higher than X4 of the vehicle speed VCAR. Within a range of the vehicle speed VCA between the predetermined values X0 and X4, the table value #TBL_KV1 is set to a smaller value as the vehicle speed VCAR is higher. The reason for this is that as the vehicle speed VCAR is higher, the kinetic energy of the vehicle 2 is larger, so that torque required for driving the rear wheels W3, W4 is smaller.

Further, the VCAR-KV tables are configured similarly to each other such that the table values #TBL_KV generally exhibit a similar tendency with respect to the vehicle speed VCAR, but at the same time are different from each other in that in a VCAR-KV table for a higher gear position, each individual table value #TBL_KV is smaller than a corresponding one in another VCAR-KV table for a lower gear position, with respect to an identical vehicle speed VCAR value (see another table value #TBL KV indicated by a dotted curve in FIG. 15). Therefore, each individual table value #TBL_KV for the first speed position is set to a larger value than any other corresponding ones in the other VCA-KV table. The reason for this is that as the gear ratio is larger, the inertial mass of the output-side gears is larger, and hence a larger torque is required for driving each of the rear wheels W3, W4.

Figure 16:
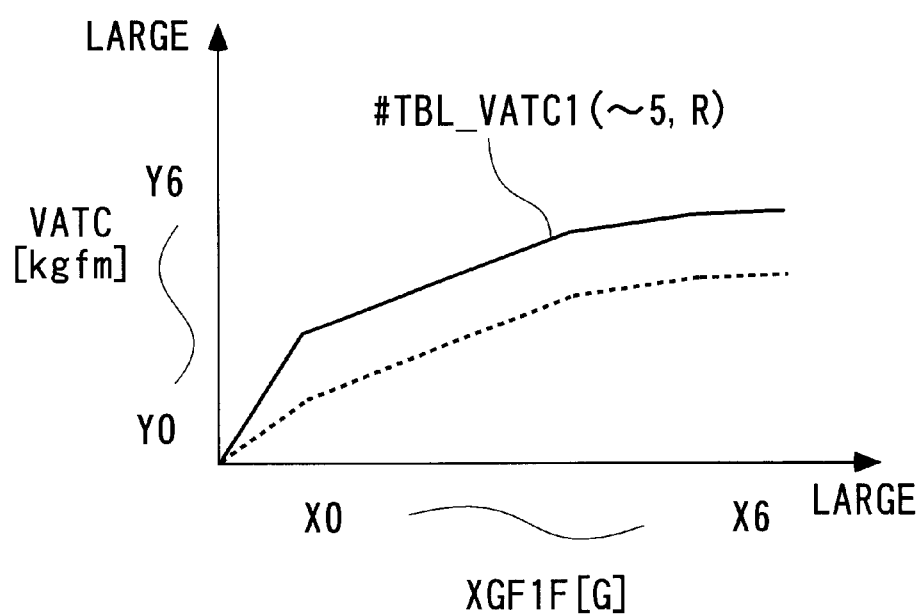
FIG. 16 is a diagram showing an example of an XGF1F-VATC table.

Then, the program proceeds to a step S84, wherein a table value #TBL_VATCn (n=1 to 5) of the basic VATC torque value VATC is retrieved from an XGF1F-VATC table an example of which is shown in FIG. 16 according to the filtered vehicle acceleration XGF1F and the SFT value, and set to the basic VATC torque value VATC.

Similarly to the VCAR-KV tables, there are provided five kinds of XGFLF-VATC tables for the respective first to fifth speed positions indicated by the respective to the SFT values 1 to 5. FIG. 16 shows an XGF1F-VATC table for the first speed position. As shown in the figure, the table value #TBL__VATC assumes a larger value as the filtered vehicle acceleration XGF1F is higher. This is because the filtered vehicle acceleration XGF1F is higher, torque required for driving the rear wheels W3, W4 is larger.

The XGF1F-VATC tables are configured similarly to each other such that table values #TBL__VATC in the respective tables exhibit a similar tendency with respect to the filtered vehicle acceleration XGF1F, but at the same time are different from each other in that in an XGF1F-VATC table for a higher speed position, each individual table value #TBL__VATC is smaller than a corresponding one in an XGF1F-VATC table for a lower speed position, with respect to an identical filtered vehicle acceleration XGF1F value (see another table value #TBL__VATC indicated by a dotted curve in FIG. 15). Therefore, each individual table value #TBL__VATC for the first speed position is set to a larger value than any other corresponding ones in the other VCAR-KV tables. The reason for this is that, as described above, as the gear ratio is larger, the inertial mass of the output gears is larger, and hence a larger torque is required for driving each of the rear wheels W3, W4.

If "R" is selected as a shift position during stoppage of the vehicle, the answer to the question of the step S82 becomes affirmative (YES), the program proceeds to a step S85, wherein, similarly to the step S83, a table value #TBL__KVR is retrieved from a VCAR-KV table for the reverse gear position according to the vehicle speed VCAR, and set to the VATC-adjusting coefficient KV. Also in the VCAR-KV table for the reverse gear position, each individual table value #TBL__KVR is set differently from corresponding ones in the respective VCAR-KV tables for the first to fifth speed positions, but the general tendency of the table value #TBL__KVR with respect to the vehicle speed VCAR is similar to those in the other VCAR-KV tables.

Then, the program proceeds to a step S86, wherein, a table value #TBL__VATCR is retrieved from a XGF1F-VATC table for the reverse gear position according to the filtered vehicle acceleration XGF1F, and set to the basic VATC torque value VATC. Also in the XGF1F-VATC table for the reverse gear position, each individual table value #TBL__VATCR is set differently from other corresponding ones in the respective XGF1F-VATC tables for the first to fifth speed positions, but the general tendency of the table value #TBL__VATCR with respect to the filtered vehicle acceleration XGF1F is similar to those in the other XGF1F-VATC tables.

After execution of the above steps S84, S86, the program proceeds to a step S87 in FIG. 14, wherein an MT·JOB process is carried out. In the MT·JOB process, as described hereinafter, the HOP correction coefficient MTHOP and the STEP correction coefficient MTSTEP are calculated.

Figure 17:
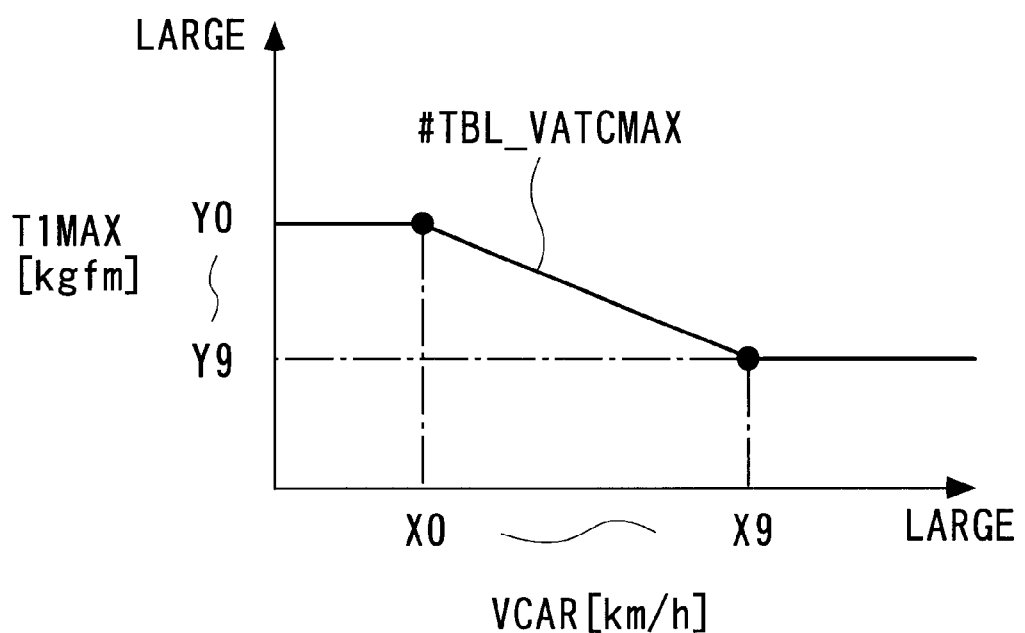
FIG. 17 is a diagram showing an example of a VCAR-T1MAX table.

Then, the program proceeds to a step S88, wherein a table value #TBL__VATCMAX of a limit VATC torque value T1MAX is retrieved from a VCAR-T1MAX table an example of which is shown in FIG. 17 according to the vehicle speed VCAR, and set to the limit VACT value T1MAX.

As shown in FIG. 17, in the VCAR-T1MAX table, the table value #TBL__VATCMAX assumes a predetermined value Y0 for a predetermined value X0 or values lower than X0 of the vehicle speed VCAR, and set to a predetermined value Y9 smaller than the predetermined value Y0 for a predetermined value X9 and values higher than X0 of the vehicle speed VCAR. Further, the VCAR-T1MAX table is configured such that as the vehicle speed VCAR increases from X0 to X9, the table value #TBL__VATCMAX is set to a smaller value. The reason for this is that as the vehicle speed VCAR is higher, the kinetic energy of the vehicle 2 is larger, so that a smaller amount of torque is required for driving the rear wheels W3, W4.

Then, the program proceeds to a step S89, wherein the corrected VATC torque value T1MM is calculated by using the following equation (4):

$$T1MM = VATC \times KV \times MTHOP \times MTSTEP \qquad (4)$$

Then, it is determined at step S90 whether or not the corrected VATC torque value T1MM is larger than the limit VATC torque value T1MAX obtained at the step S88. If the answer to the question is negative (NO), the desired VATC torque value T1M is set to the corrected VATC torque value T1MM at a step S91, whereas if the answer to the question is affirmative (YES), the desired VATC torque value T1M is set to the limit VATC torque value TL1MAX at a step S92.

After execution of the step S91 or S92, the program proceeds to a step S93, wherein a VATC DELAY process is carried out. In the VATC DELAY process, the intermediate VATC torque value T1 is calculated as a value obtained by correcting the present value of the desired VATC torque value T1M so as to prevent a large difference from occurring between the present value of the desired VATC torque value T1M and the immediately preceding value of the same (i.e. for reduction of a torque step).

Then, at the step S105, the immediately preceding value T1O of the intermediate VATC torque value T1 is set to the intermediate VATC torque value T1 determined at the step S93, followed by terminating the program.

As described above, the calculation of the intermediate VATC torque value T1 is started at the start of the vehicle 2 after stoppage and continued until the answer to the question of the step S80 becomes affirmative (YES), i.e. until the vehicle speed VCAR exceeds the predetermined speed #VATCNV.

Then, when the vehicle speed VCAR being progressively increased after the start of the vehicle 2 exceeds the predetermined speed #VATCNV, i.e. when the answer to the question of the step S80 becomes affirmative (YES), the program proceeds to a step S94, wherein it is determined whether or not the drive torque flag F__TD assumes "1".

If the answer to the question is negative (NO), which means that the vehicle 2 is accelerating, the program proceeds to a step S95, wherein it is determined whether or not the drive torque TD is larger than a predetermined value #VATCCNTD. If the answer to the question is affirmative (YES), which means that the vehicle 2 is accelerating, and the vehicle speed VCAR and the drive torque TD assume large values, the program proceeds to the steps S81 et seq., and the intermediate VATC torque value T1 is calculated as described above.

On the other hand, if the answer to the question of the step S95 is negative (NO), i.e. if the drive torque TD is equal to or smaller than the predetermined value #VATCCNTD even during acceleration of the vehicle 2, the program proceeds to the steps S96 et seq., and the intermediate VATC torque value T1 is set to the value of 0 as described above.

When acceleration of the vehicle 2 is terminated and deceleration of the same is started, i.e. when the answer to the question of the step S94 becomes affirmative (YES), the program skips over the step S95 to the steps S96 et seq., and the intermediate VATC torque value T1 is set to the value of 0.

As described above, the intermediate VATC torque value T1 is calculated, in the front-rear distribution torque-calculating process, based on the filtered vehicle acceleration XGF1F determined at the step S51 in FIG. 9, so that the value T1 can faithfully reflect an actual accelerating condition of the vehicle 2.

Figure 18:
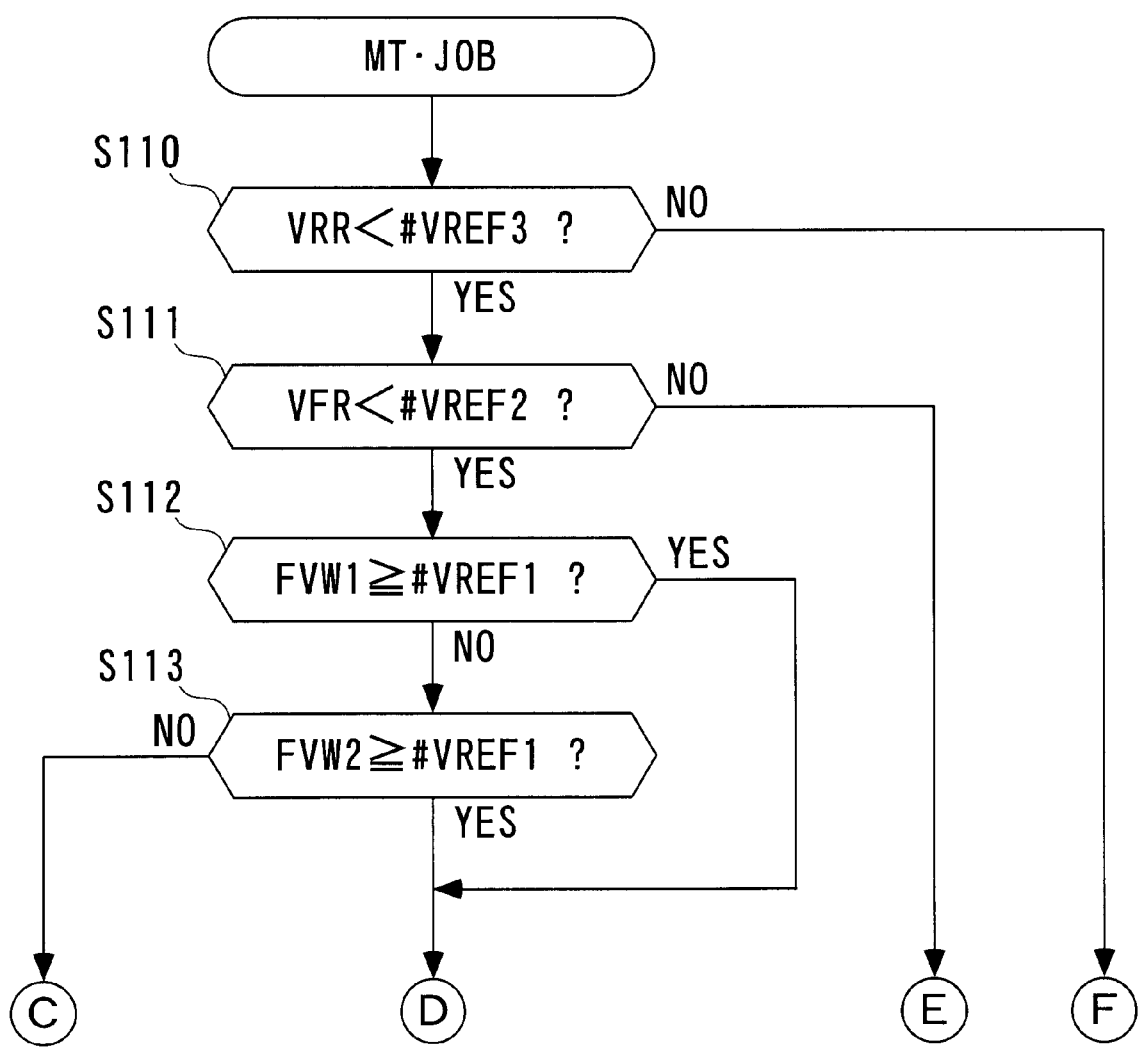
FIG. 18 is a flowchart showing a routine for carrying out an MT·JOB process which is executed at a step S87 in FIG. 14.

In the following, the aforementioned MT·JOB process executed at the step S87 will be described with reference to FIGS. 18 and 19. In this description, a case of the vehicle 2 being started on an icy road after stoppage is taken as an example, and a sequence of operations carried out after the start of the vehicle 2 is followed. In the present process, first, it is determined at a step S110 whether or not an average rear-wheel speed VRR is lower than a third predetermined speed #VREF3.

The average rear-wheel speed VRR is obtained by averaging left and right filtered rear-wheel speeds FVW3, FVW4 which are obtained, respectively, by subjecting the detected left and right rear-wheel speeds VW3, VW4 to predetermined filtering processing. Further, the third predetermined speed #VREF3 is set to a value which is expected to be obtained when the two rear wheels W3, W4 are each positively rotating.

During stoppage of the vehicle 2, the answer to the question of the step S110 is affirmative (YES), so that the program proceeds to a step S111, wherein it is determined whether or not an average front-wheel speed VFR is lower than a second predetermined speed #VREF2. Similarly to the average rear-wheel speed VRR, the average front-wheel speed VFR is obtained by averaging left and right filtered front-wheel speeds FVW1, FVW2 which are obtained, respectively, by subjecting the detected left and right front-wheel speeds VW1, VW2 to predetermined filtering processing.

The second predetermined speed #VREF2 is also set to a value which is expected to be obtained when the two front wheels W1, W2 are each positively rotating. Further, in the present embodiment, the second predetermined speed #VREF2 is set to the same value as the third predetermined speed #VREF3 (e.g. 5 km/h) so as to distribute torque to the two rear wheels W3, W4 until it is judged that the rear wheels W3, W4 have started to be positively rotating. It should be noted that the third predetermined speed #VREF3 may be set to a slightly higher value than the second predetermined speed #VREF2.

During stoppage of the vehicle 2, the answer to the question of the step S111 is affirmative (YES), so that the program proceeds to a step S112, wherein it is determined whether or not a filtered left front-wheel speed FVW1 is equal to or higher than a first predetermined speed #VREF1. The first predetermined speed #VREF1 is also set to a value which is expected to be obtained when the left front wheel W1 or the right front wheel W2 is positively rotating. Further, in the present embodiment, the first predetermined speed #VREF1 is set to the same value as the second and third predetermined speeds #VREF2 and #VREF3 (e.g. 5 km/h).

When the vehicle 2 is in stoppage, the answer to the question of the step S112 is negative (NO), so that the program proceeds to a step S113, wherein it is determined whether or not a filtered right front-wheel speed FVW2 is equal to or higher than the first predetermined speed #VREF1. During stoppage of the vehicle 2, the answer to the question of the step S113 is negative (NO), so that the program proceeds to a step S114 in FIG. 19, wherein the count TMHOP of the HOP timer is set to 0. Further, at a step S115, the count TMSTEP of the STEP timer is set to 0.

Figure 20:
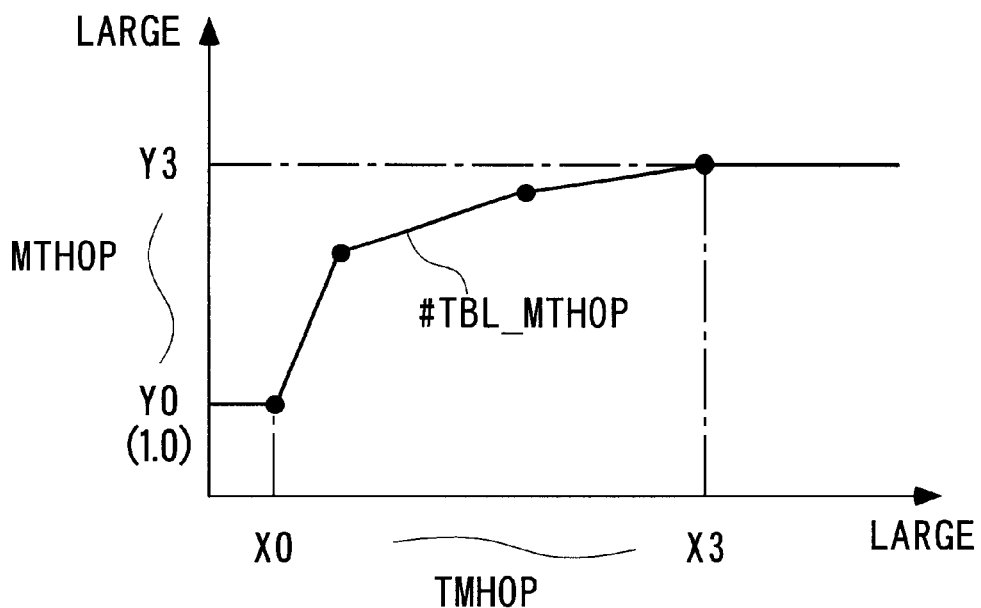
FIG. 20 is a diagram showing an example of a TMHOP-MTHOP table.

Then, the program proceeds to a step S126, wherein a table value #TBL_MTHOP (TMHOP) is retrieved from a TMHOP-MTHOP table an example of which is shown in FIG. 20 according to the HOP timer count TMHOP, and set to the HOP correction coefficient MTHOP.

As shown in FIG. 20, in the TMHOP-MTHOP table, the table value #TBL_MTHOP (TMHOP) is set to a predetermined value Y0 (1.0) for a predetermined value X0 (>0) and values smaller than X0 of the HOP timer count TMHOP, and to a predetermined value Y3 larger than the predetermined value Y0 for a predetermined value X3 and values larger than X3 of the count TMHOP. Further, the TMHOP-MTHOP table is configured such that as the HOP timer count TMHOP increases from X0 to X3, the table value #TBL_TMHOP assumes a larger value. The table value #TBL_TMHOP is thus set so as to progressively increase torque distributed to the rear wheels W3, W4 with the lapse of time, thereby improving startability of the vehicle 2 e.g. on a low-$\mu$ road surface such as an icy road surface. In the present loop, TMHOP=0 holds at the step S114, so that the HOP correction coefficient MTHOP is set to 1.0.

Figure 21:
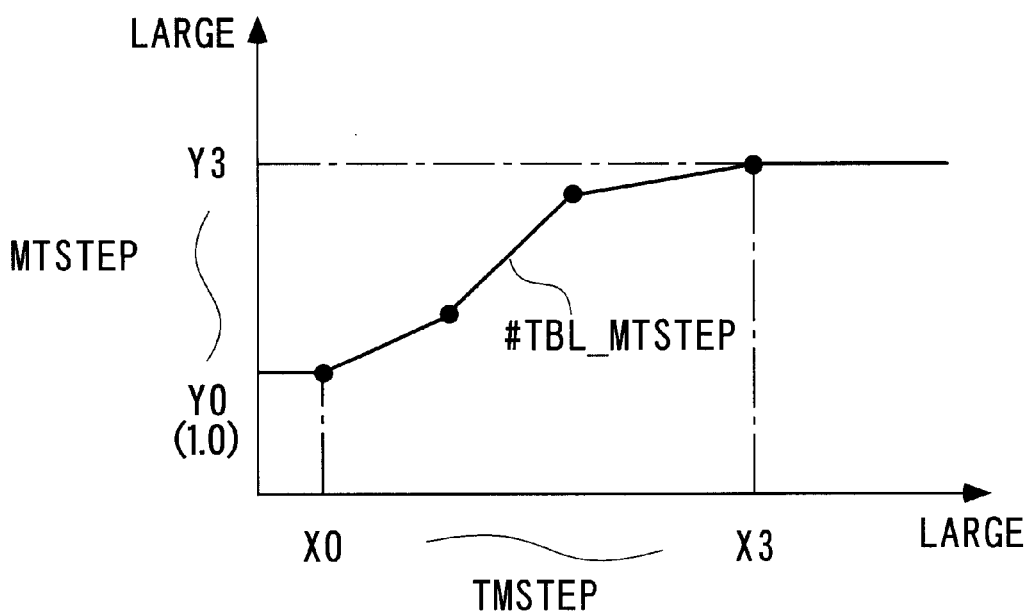
FIG. 21 is a diagram showing an example of a TMSTEP-MTSTEP table.

Then, at a step S127, a table value #TBL_MTSTEP (TMSTEP) is retrieved from a TMSTEP-MTSTEP table an example of which is shown in FIG. 21 according to the STEP timer count TMSTEP, and set to the STEP correction coefficient MTSTEP, followed by terminating the program.

As shown in the figure, the TMSTEP-MTSTEP table is configured such that it generally exhibits a similar tendency to that of the above TMHOP-MTHOP table. More specifically, the table value #TBL_MTSTEP (TMSTEP) is set to a predetermined value Y0 (1.0) for a predetermined value X0 (>0) and values smaller than X0 of the STEP timer count TMSTEP, and to a predetermined value Y3 larger than the predetermined value Y0 for a predetermined value X3 (predetermined value #TMS1 referred to hereinafter) and values larger than X3 of the count TMSTEP. Further, the TMSTEP-MTSTEP table is configured such that as the STEP timer count TMSTEP increases from X0 to X3, the table value #TBL_MTSTEP assumes a larger value. The table value #TBL_MTSTEP is thus set so as to progressively increase torque distributed to the rear wheels W3, W4 with the lapse of time, thereby improving startability of the vehicle 2 e.g. on a low-$\mu$ road surface such as an icy road surface, as described above. In the present loop, TMSTEP=0 holds at the step S115, so that the STEP correction coefficient MTSTEP is set to 1.0.

On the other hand, if the answer to the question of one of the steps 112, 113 is affirmative (YES) after the start of the vehicle 2 on the icy road surface, for instance, i.e. if the average front-wheel speed VFR is below the second predetermined speed #VREF2, but one of the filtered left and right front-wheel speeds FVW1, FVW2 is equal to or higher than the first predetermined speed #VREF1 and the other is below the same, which means that a difference in speed has been produced between the front wheels W1 and W2 (e.g. occurrence of slipping of one of the front wheels), the program proceeds to a step S116, wherein it is determined whether or not the HOP timer count TMHOP has reached an upper limit count #TMH1 thereof. The upper limit count #TMH1 is set to the predetermined count X3.

When the present loop is being first executed, the answer to the question of the step S116 is negative (NO), so that the program proceeds to a step S117, wherein the HOP timer count TMHOP is incremented. Then, the steps 126, 127 are executed to set the HOP correction coefficient MTHOP and the STEP correction coefficient MTSTEP, respectively, as described above, followed by terminating the program. On the other hand, if the answer to the question of the step S116 is affirmative (YES), i.e. if the HOP timer count TMHOP has reached the upper limit count #TMH1, the step S117 is skipped, and the steps 126, 127 are executed, followed by terminating the program.

On the other hand, if the answer to the question of the step S111 is negative (NO), i.e. the average rear-wheel speed VRR is lower than the third predetermined speed #VREF3 and the average front-wheel speed VFR is equal to or higher than the second predetermined speed #VREF2 (=the third predetermined speed #VREF3), which means that the average front-wheel speed VFR is higher than the average rear-wheel speed VRR. It is judged that the front wheels are slipping, and the program proceeds to a step S118 in FIG. 19, wherein it is determined whether or not the STEP timer count TMSTEP has reached the upper limit count #TMS1. The upper limit count #TMS1 is set to the aforementioned predetermined count X3 of the STEP timer count TMSTEP.

When the present loop is being first executed, the answer to the question of the step S118 is negative (NO), so that the STEP timer count TMSTEP is incremented at a step S119, followed by the program proceeding to the steps S126 et seq. On the other hand, if the answer to the question of the step S118 is affirmative (YES), i.e. if the STEP timer count TMSTEP has reached the upper limit count #TMS1, the step S119 is skipped, and the steps 126, 127 are executed, followed by terminating the program.

Figure 19:
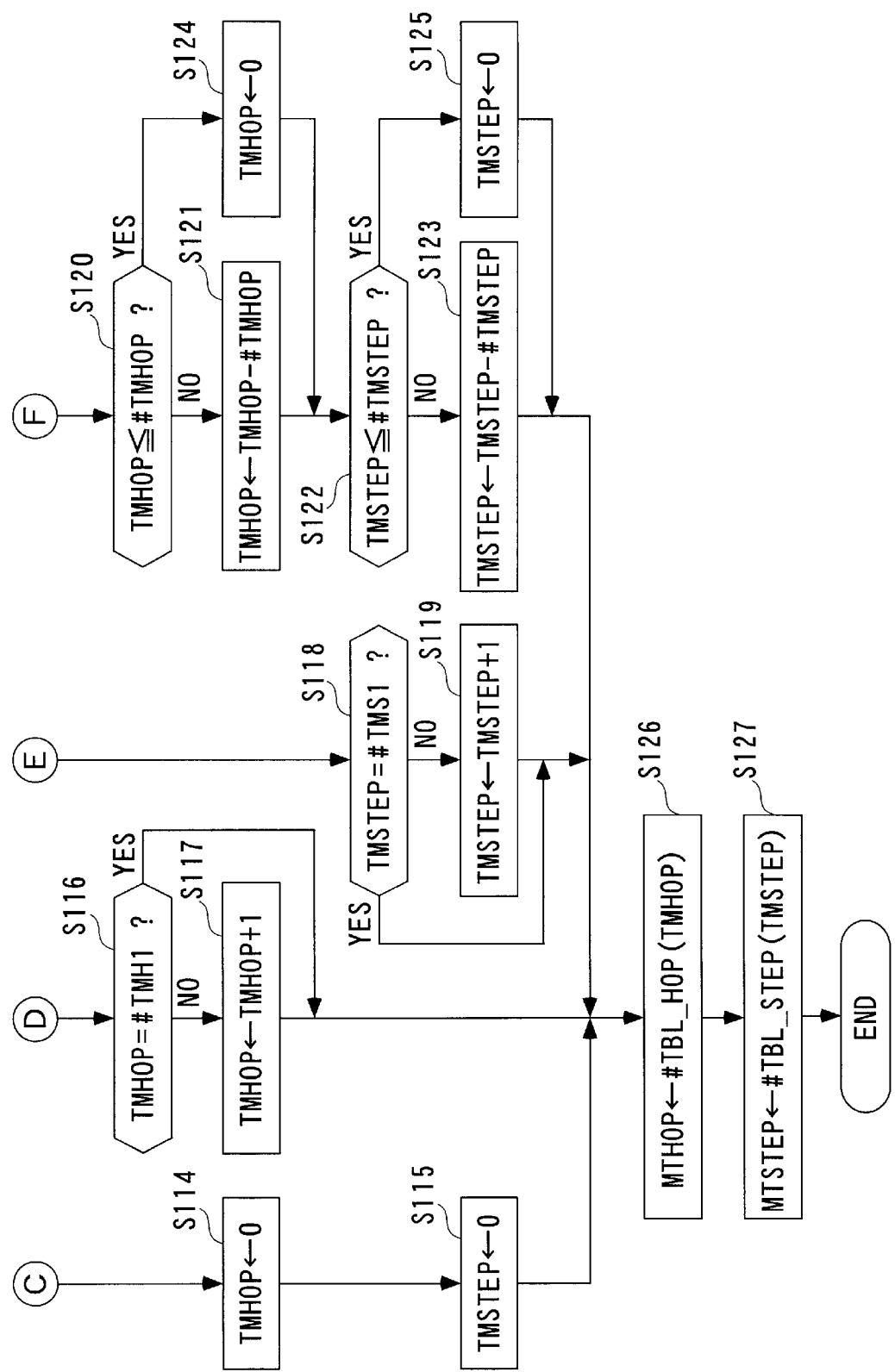
FIG. 19 is a continuation of the FIG. 18 flowchart.

If the answer to the question of the step S110 is negative (NO), which means that the filtered left and right rear-wheel speeds FVW3, FVW4 have been progressively increased with the lapse of time and the average rear-wheel speed VRR has become equal to or higher than the third predetermined speed #VREF3, the program proceeds to a step S120 in FIG. 19, wherein it is determined whether or not the HOP timer count TMHOP is equal to or smaller than a predetermined threshold value #TMHOP.

If the answer to the question is negative (NO), the program proceeds to a step S121, wherein the predetermined threshold value #TMHOP is subtracted from the HOP timer count TMHOP.

Then, the program proceeds to a step S122, wherein it is determined whether or not the STEP timer count TMSTEP is equal to or smaller than a predetermined threshold value #TMSTEP.

If the answer to the question is negative (NO), the predetermined threshold value #TMSTEP is subtracted from the STEP timer count TMSTEP at a step S123, followed by the program proceeding to the steps S126 et seq.

On the other hand, if the answer to the question of the step S120 is affirmative (YES), the HOP timer count TMHOP is set to 0 at a step S124, followed by the program proceeding to the step S122.

When the answer to the question of the step S122 becomes affirmative (YES) with the lapse of time, the STEP timer count TMSTEP is set to 0 at a step S125, followed by the program proceeding to the step S126.

In the MT·JOB process described above, when one of the filtered left and right front-wheel speeds FVW1, FVW2 is equal to or higher than the first predetermined speed #VREF1 and the other is lower than the same, the HOP correction coefficient MTHOP is held at a larger value than 1.0 until the average front-wheel speed VFR becomes equal to or higher than the second predetermined speed #VREF2, whereby the intermediate VATC torque value T1 calculated at the step S93 in FIG. 14 is increased, and at the same time, the HOP correction coefficient MTHOP is progressively increased with the lapse of time, whereby the intermediate VATC torque value T1 is also progressively increased.

Further, when the average front-wheel speed VFR is equal to or higher than the second predetermined speed #VREF2, the STEP correction coefficient MTSTEP is held at a larger value than 1.0 until the average rear-wheel speed VRR becomes equal to or higher than the third predetermined speed #VREF3, whereby the intermediate VATC torque value T1 is increased, and at the same time, the STEP correction coefficient MTSTEP is progressively increased with the lapse of time, whereby the intermediate VATC torque value T1 is also progressively increased. In short, when one of the left and right front wheels W1, W2 is slipping, or when both of them are slipping, the intermediate VATC torque value T1 is progressively increased until the average rear-wheel speed VRR becomes equal to the third predetermined speed #VREF3.

Further, from a time point when the average rear-wheel speed VRR has become equal to or higher than the third predetermined speed #VREF3, the HOP correction coefficient MTHOP and the STEP correction coefficient MTSTEP are progressively decreased, whereby the intermediate VATC torque value T1 is also progressively decreased, so that occurrence of a torque step can be prevented.

Figure 22:
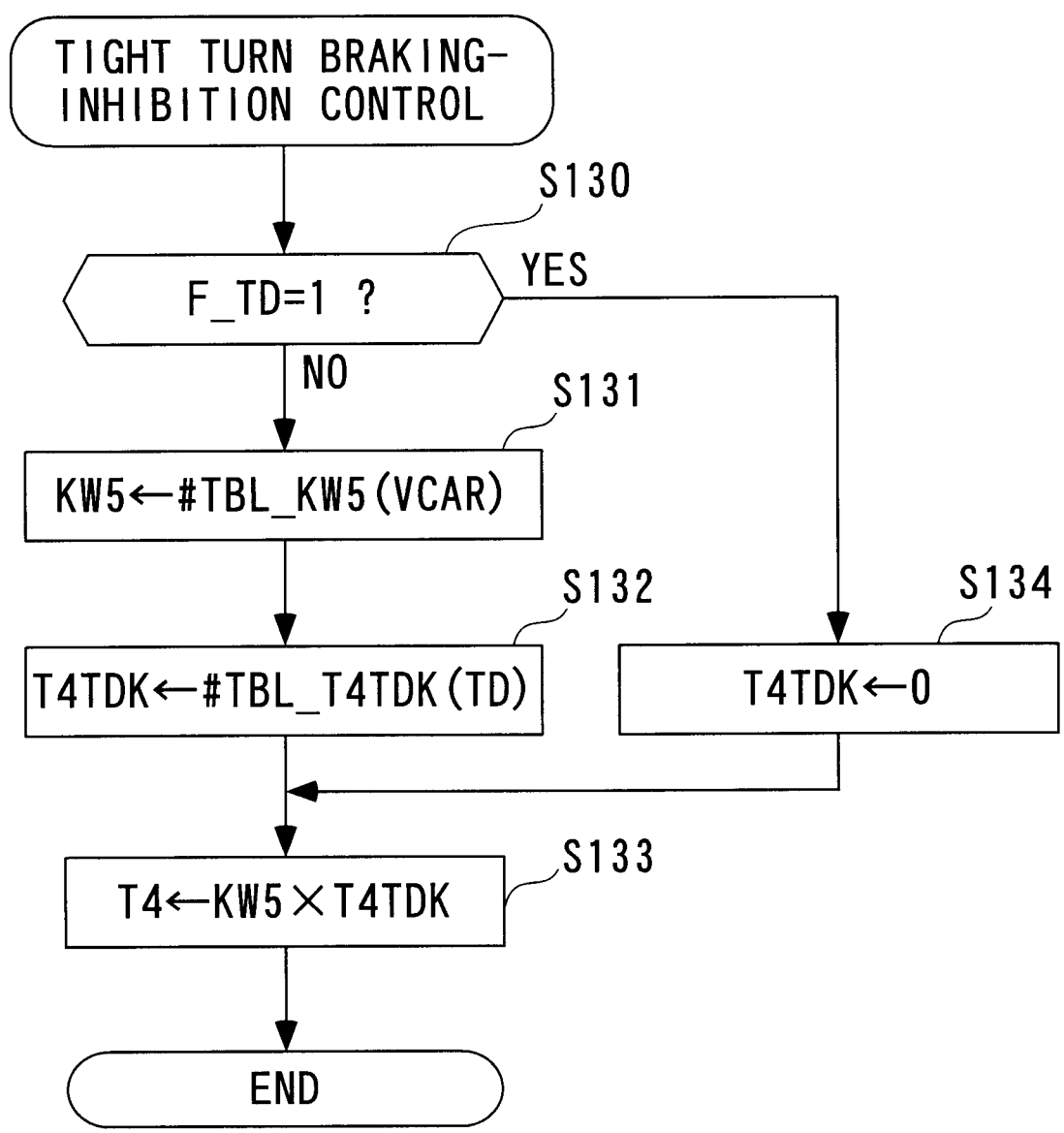
FIG. 22 is a flowchart showing a routine for carrying out a tight turn braking-inhibiting control process which is executed at a step S41 in FIG. 7.

In the following, description will be made, with reference to FIG. 22, of the tight turn braking-inhibiting control process executed at the step S41 of the front-rear distribution torque control process described above. In the tight turn braking-inhibiting control process, as described below, the aforementioned tight turn braking-inhibiting coefficient T4 is calculated based on the vehicle speed VCAR and the drive torque TD. First, it is determined at a step S130 whether or not the drive torque flag F_TD assumes "1".

Figure 23:
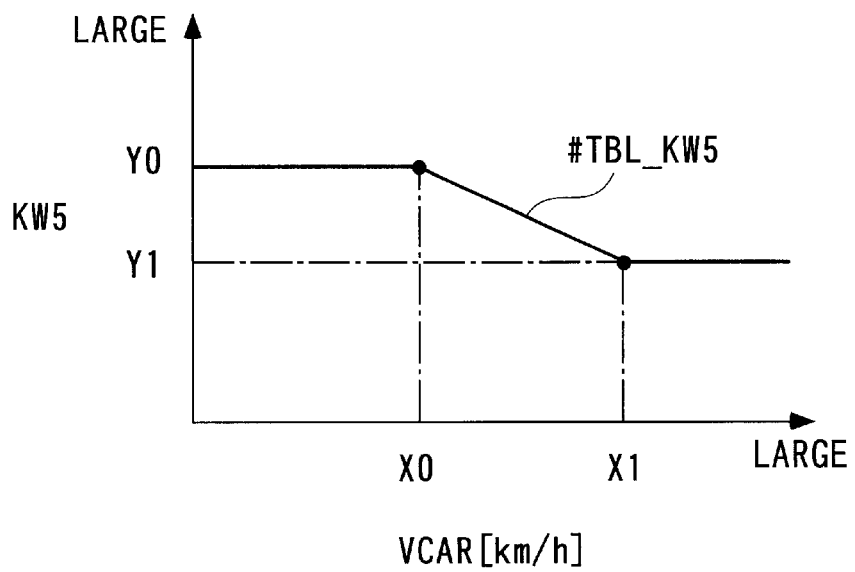
FIG. 23 is a diagram showing an example of a VCAR-KW5 table.

If the answer to the question is negative (NO), which means that the vehicle 2 is accelerating, the program proceeds to a step S131, wherein a table value #TBL_KW5 of a vehicle speed-dependent correction coefficient KW5 is retrieved from a VCAR-KW5 table an example of which is shown in FIG. 23 according to the vehicle speed VCAR, and set to the vehicle speed-dependent correction coefficient KW5.

As shown in FIG. 23, in the VCAR-KW5 table, the table value #TBL_KW5 is set to a predetermined value Y0 for a predetermined speed X0 and values lower than X0 of the vehicle speed VCAR, and to a predetermined value Y1 smaller than the predetermined value Y0 for a predetermined speed X1 and values higher than X1 of the vehicle speed VCAR. Further, the VCAR-KW5 table is configured such that as the vehicle speed VCAR increases from X0 to X1, the table value #TBL_KW5 linearly decreases. The table value #TBL_KW5 is thus set so as to reduce the tight turn braking-inhibiting coefficient T4 as the vehicle speed VCAR is higher because a tight turn braking force becomes larger as the vehicle speed VCAR is larger.

Figure 24:
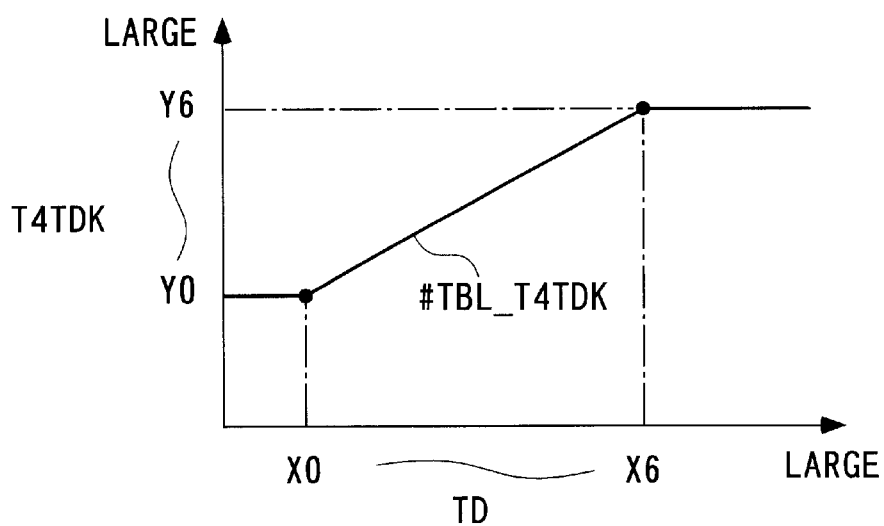
FIG. 24 is a diagram showing an example of a TD-T4TDK table.

Then, the program proceeds to a step S132, wherein a table value #TBL_T4TDK of a drive torque-dependent correction coefficient T4TDK is retrieved from a TD-T4TDK table an example of which is shown in FIG. 24 according to the drive torque TD to obtain, and set to the coefficient T4TDK.

As shown in the figure, in the TD-T4TDK table, the table value #TBL_T4TDK is set to a predetermined value Y0 for a predetermined value X0 and values smaller than X0 of the drive torque TD, and to a predetermined value Y6 larger than the predetermined value Y0 for a predetermined value X6 and values larger than X6 of the drive torque TD. Further, TD-T4TDK table is configured such that as the drive torque TD increases from X0 to X6, the table value #TBL_T4TDK assumes a larger value. The table value #TBL_T4TDK is thus set so as to increase the tight turn braking-inhibiting coefficient T4 as the drive torque is larger because with an increase in the drive torque TD, the degree of the advancing force of the vehicle 2 overcoming a tight turn braking force becomes larger, which makes tight turn braking less prone to occur.

Then, at a step S133, the tight turn braking-inhibiting coefficient T4 is set to the product of the vehicle speed-dependent correction coefficient KW5 obtained at the step S131 and the drive torque-dependent correction coefficient T4TDK obtained at the step S132, followed by terminating the program.

On the other hand, if the answer to the question of the step S130 is affirmative (YES), i.e. if the vehicle is in stoppage or being decelerated, the drive torque-dependent correction coefficient T4TDK is set to 0 at a step S134, followed by the program proceeding to the step S133. Thus, the drive torque-dependent correction coefficient T4TDK is held at 0 during the stoppage or deceleration of the vehicle 2.

By setting the VATC torque T0 to a value obtained by multiplying the intermediate VATC torque value T1 by the tight turn braking-inhibiting coefficient T4 as described hereinbefore in the description of the T0-calculating process executed at the step S42 of the front-rear distribution torque control process, it is possible to reliably prevent occurrence of tight turn braking phenomenon.

Next, the control amount-limiting process included in the VATC control process executed at the step S1 in FIG. 2 will be described with reference to FIG. 25. In the control amount-limiting process, as described below, the final desired VATC torque value TOBJM is calculated based on the POSI value and an initial flag F_IGDLY2.

Figure 26:
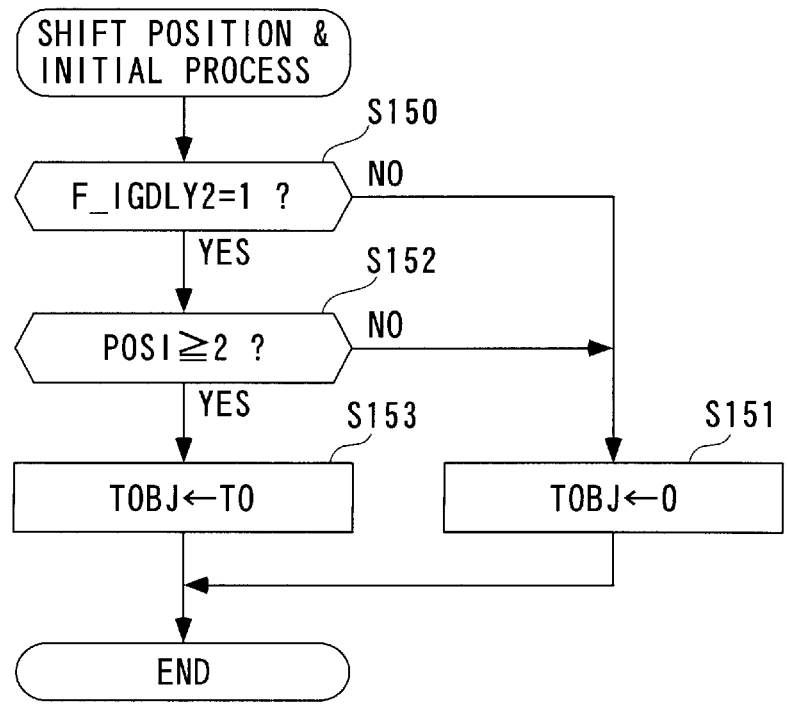
FIG. 26 is a flowchart showing a routine for carrying out a shift position & initial process which is executed at a step S140 in FIG. 25.

First, at a step S140, a shift position & initial process is executed to determine a semi-final desired VATC torque value TOBJ. In the following, the shift position & initial process will be described with reference to FIG. 26.

In the process, first, it is determined at a step S150 whether or not the initial flag F_IGDLY2 assumes "1". The initial flag F_IGDLY2 is held at "0" until a predetermined time period (e.g. 1 sec.) elapses after the start of the engine 3, and set to "1" after the lapse of the predetermined time period.

If the answer to the question of the step S150 is negative (NO), which means that the engine 3 has just been started, the semi-final desired VATC torque value TOBJ is set to 0 at a step S151, followed by terminating the program. The step is executed to inhibit calculation of the semi-final desired VATC torque value TOBJ because the operating condition of the engine 3 is unstable immediately after the start.

On the other hand, if the answer to the question of the step S150 is affirmative (YES), which means that the predetermined time period has elapsed after the start of the engine 3, the program proceeds to a step S152, wherein it is determined whether or not the POSI value is equal to or larger than 2.

If the answer to the question is negative (NO), which means that the shift position is "N" or "P", or that the shift lever is in the no-position state, the semi-final desired VATC torque value TOBJ is set to 0 at the step S151, followed by terminating the program. The reason why the semi-final desired VATC torque value TOBJ is set to 0 is that it is not required to distribute torque to the rear wheels W3, W4 when the shift position is "N" or "P", or when the shift lever is in the no-position state.

On the other hand, if the answer to the question of the step S152 is affirmative (YES), i.e. if POSI≧2 holds which means that a shift position for forward or reverse drive operation is selected, at the following step 153, the semi-final desired VATC torque value TOBJ is set to the VATC torque T0 calculated by the T0-calculating process executed at the step S42, followed by terminating the program. The VATC torque T0 is obtained by multiplying the intermediate VATC torque value T1 by the tight turn braking-inhibiting coefficient T4 as described hereinbefore, so that the VATC torque T0 faithfully reflects the actual accelerating condition of the vehicle 2.

Figure 25:
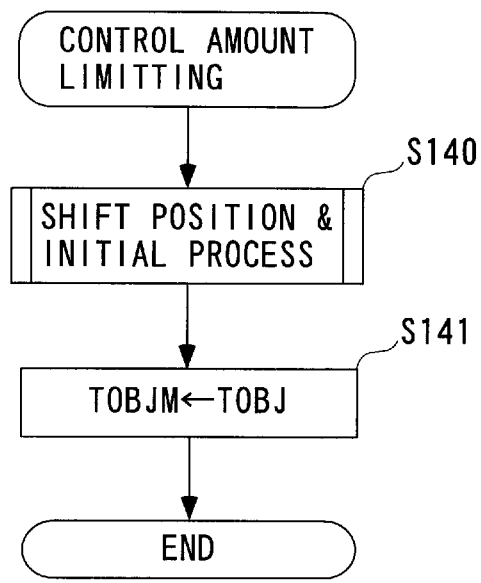
FIG. 25 is a flowchart showing a main routine for carrying out a control amount-limiting process.

After the shift position & initial process is executed at the step S140 as described above, the program proceeds to a step S141 in FIG. 25, and the final desired VATC torque value TOBJM is set to the semi-final desired VATC torque value TOBJ obtained at the step S140, followed by terminating the program.

As described above, in the VATC control process, the final desired VATC torque value TOBJM is calculated only when the engine 3 is in a stable operating condition after its start, and when a shift position for forward or reverse drive operation is selected and it is required to distribute torque to the rear wheels W3, W4. Further, the final desired VATC torque value TOBJM is set to the VATC torque T0 which faithfully reflects the actual accelerating condition of the vehicle 2, and hence, differently from a conventional method in which torque to be distributed is calculated based on the throttle opening, the present embodiment makes it possible to distribute a proper amount of torque to the rear wheels W3, W4 based on the final desired VATC torque value TOBJM while reflecting the actual accelerating condition of the vehicle 2 thereon, thereby enhancing the startability and fuel economy of the vehicle 2.

As described above, the VATC torque T0 is calculated based on the intermediate VATC torque value T1, which is progressively increased by the MT·JOB process until the average rear-wheel speed VRR becomes equal to or higher than the third predetermined speed #VREF3, when one of the filtered left and right front-wheel speeds FVW1, FVW2 is equal to or higher than the first predetermined speed #VREF1 and at the same time the other is lower than the same, or when the average rear-wheel speed VRR is lower the third predetermined speed #VREF 3 and the average front-wheel speed VFR is equal to or higher than the second predetermined speed #VREF2 (=the third predetermined speed #VREF 3), in other words, when at least one of the left and right front wheels W1, W2 is slipping or when a difference in speed is produced between the front wheels and the rear wheels. Thus, the final desired VATC torque value TOBJM can be properly determined according to the slipping state of the front wheels W1, W2. Particularly, according to the present embodiment, in cases where the filtered vehicle acceleration XGF1F of the vehicle 2 tends to be smaller by stepping on the accelerator pedal slowly or softly e.g. during the start of the vehicle 2 on an icy road surface, it is possible to start the vehicle 2 smoothly when at least one of the front wheels W1, W2 is slipping since the final desired VATC torque value TOBJM of torque distributed to the rear wheels W3, W4 is increased, as described above.

It is further understood by those skilled in the art that the foregoing is a preferred embodiment of the invention, and that various changes and modifications may be made without departing from the spirit and scope thereof.

What is claimed is:

1. A driving force control system for a four-wheel drive vehicle including a pair of front wheels, and a pair of rear wheels, one of said pairs being main drive wheels, and the other of said pairs being auxiliary drive wheels, the driving force control system controlling engagement forces of clutches to thereby control driving forces distributed to said auxiliary drive wheels, the driving force control system comprising:
driving force control means for controlling said engagement forces of said clutches such that said driving forces are distributed to said auxiliary drive wheels, on condition that there is satisfied at least one of the following conditions that a wheel speed of one of said main drive wheels is equal to or higher than a first predetermined speed, and at the same time, a wheel speed of the other of said main drive wheels is lower than said first predetermined speed, and that an average wheel speed of said main drive wheels is equal to or higher than a second predetermined speed, and at the same time, an average wheel speed of said auxiliary drive wheels is lower than said second predetermined speed, until said average wheel speed of said auxiliary drive wheels reaches a third predetermined speed equal to or higher than said second predetermined speed.

2. A driving force control system for a four-wheel drive vehicle including a pair of front wheels, and a pair of rear wheels, one of said pairs being main drive wheels, and the other of said pairs being auxiliary drive wheels, the driving force control system controlling engagement forces of clutches to thereby control driving forces distributed to said auxiliary drive wheels, the driving force control system comprising:
vehicle acceleration-calculating means for calculating a vehicle acceleration of said vehicle based on a demanded driving force demanded by said main drive wheels; and
driving force-calculating means for calculating said driving forces to be distributed to said auxiliary drive wheels based on the calculated vehicle acceleration.

3. A driving force control system according to claim 2, further including driving force-increasing means for increasing said driving forces distributed to said auxiliary drive wheels, on condition that there is satisfied at least one of the following conditions that a wheel speed of one of said main drive wheels is equal to or higher than a first predetermined speed, and at the same time, a wheel speed of the other of said main drive wheels is lower than said first predetermined speed, and that an average wheel speed of said main drive wheels is equal to or higher than a second predetermined speed, and at the same time, an average wheel of said auxiliary drive wheels is lower than said second predetermined speed, until said average wheel speed of said auxiliary drive wheels reaches a third predetermined speed equal to or higher than said second predetermined speed.

4. A driving force control system according to claim 3, wherein said driving force-increasing means includes progressively-increasing means for progressively increasing said driving forces distributed to said auxiliary drive wheels with the lapse of time.

5. A driving force control system according to claim 3, further including driving force-progressively decreasing means for progressively decreasing said driving forces distributed to said auxiliary drive wheels with the lapse of time, after said average wheel speed of said auxiliary drive wheels reaches said third predetermined speed.

6. A driving force control system according to claim 2, further including vehicle speed detection means for detecting a vehicle speed of said vehicle, and correction means for correcting said driving forces for prevention of tight turn, such that said driving forces are made smaller as said vehicle speed detected by said vehicle speed detection means is larger, and at the same time that said driving forces are made larger as said demanded driving force is larger.

7. A driving force control system according to claim 2, wherein said demanded driving force is calculated based on a basic driving force calculated based on an engine rotational speed and an intake pipe absolute pressure, by using a coefficient corresponding to a gear ratio of said vehicle, and a correction term corresponding to an inertial force of said vehicle.

8. A driving force control system according to claim 2, wherein said vehicle acceleration-calculating means calculates said vehicle acceleration by subtracting a value corresponding to a running resistance of said vehicle from a vehicle acceleration value calculated based on said demanded driving force.

9. A driving force control system for a four-wheel drive vehicle including a pair of front wheels and a pair of rear wheels, one of said pairs being main drive wheels and another of said pairs being auxiliary drive wheels, the driving force control system controlling engagement forces of clutches to thereby control driving forces distributed to said auxiliary drive wheels, the driving force control system comprising:
vehicle acceleration-calculating means for calculating a vehicle acceleration of said vehicle based on a demanded driving force demanded by said main drive wheels and weight of said vehicle; and
driving force-calculating means for calculating said driving forces to the distributed to said auxiliary drive wheels based on the calculated vehicle acceleration.

10. A driving force control system according to claim 9, further including driving force-increasing means for increasing said driving forces distributed to said auxiliary drive wheels on condition that there is satisfied at least one of the following conditions that a wheel speed of one of said main drive wheels is equal to or higher than a first predetermined speed, and at the same time, a wheel speed of another of said main drive wheels is lower than said first predetermined speed, and that an average wheel speed of said main drive wheels is equal to or greater than a second predetermined speed, and at the same time, an average wheel speed of said auxiliary drive wheels is lower than said second predetermined speed, until said average wheel speed of said auxiliary drive wheels reaches a third predetermined speed equal to or higher than said second predetermined speed.

11. A driving force control system according to claim 10, wherein said driving force-increasing means includes progressively-increasing means for progressively increasing said driving forces distributed to said auxiliary drive wheels with the lapse of time.

12. A driving force control system according to claim 10, further including driving force-progressively decreasing means for progressively decreasing said driving forces distributed to said auxiliary drive wheels with the lapse of time, after said average wheel speed of said auxiliary drive wheels reaches said third predetermined speed.

13. A driving force control system according to claim 9, further including vehicle speed detection means for detecting a vehicle speed detection means for detecting a vehicle speed of said vehicle, and correction means for detecting a vehicle, and correction means for correcting said driving forces for prevention of tight turn, such that said driving forces are made smaller as said vehicle speed detected by said vehicle speed detection means is larger, and at the same time that said driving forces are made larger as said demanded driving force is larger.

14. A driving force control system according to claim 9, wherein said demanded driving force is calculated based on a basic driving force calculated based on an engine rotational speed and an intake pipe absolute pressure, by using a coefficient corresponding to a gear ratio of said vehicle, and a correction term corresponding to an inertial force of said vehicle.

15. A driving force control system according to claim 9, wherein said vehicle acceleration-calculating means calculates said vehicle acceleration-calculating means calculates said vehicle acceleration by subtracting a value corresponding to a running resistance of said vehicle from a vehicle acceleration value calculated based on said demanded driving force.

* * * * *